(12) United States Patent
Chen et al.

(10) Patent No.: US 11,949,496 B1
(45) Date of Patent: Apr. 2, 2024

(54) LOW LATENCY SCHEDULE-DRIVEN HANDOVERS

(71) Applicant: Space Exploration Technologies Corp., Hawthorne, CA (US)

(72) Inventors: Chen Chen, Irvine, CA (US); Pavel Chikulaev, Redmond, WA (US); Sergii Ziuzin, Redmond, WA (US); David Sacks, Redmond, WA (US); Peter J. Worters, San Carlos, CA (US); Darshan Purohit, Fremont, CA (US); Yashodhan Dandekar, Cupertino, CA (US); Vladimir Skuratovich, Seattle, WA (US); Andrei Pushkin, Woodinville, WA (US); Phillip E. Barber, Sammamish, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 17/337,218

(22) Filed: Jun. 2, 2021

Related U.S. Application Data

(60) Provisional application No. 63/035,461, filed on Jun. 5, 2020.

(51) Int. Cl.
| | |
|---|---|
| *H04B 7/185* | (2006.01) |
| *H04W 36/00* | (2009.01) |
| *H04W 36/08* | (2009.01) |
| *H04W 88/16* | (2009.01) |

(52) U.S. Cl.
CPC ..... *H04B 7/18541* (2013.01); *H04B 7/18513* (2013.01); *H04W 36/0016* (2013.01); *H04W 36/08* (2013.01); *H04W 88/16* (2013.01)

(58) Field of Classification Search
CPC .......... H04B 7/18541; H04B 7/18513; H04W 36/0016; H04W 36/08; H04W 88/16
See application file for complete search history.

(56) References Cited

U.S. PATENT DOCUMENTS

| | | | |
|---|---|---|---|
| 11,336,364 B1 | 5/2022 | Masoomzadeh | |
| 2006/0052107 A1* | 3/2006 | Isobe | H04W 36/26 455/439 |
| 2012/0204224 A1* | 8/2012 | Wang | H04L 67/63 726/3 |
| 2015/0024677 A1* | 1/2015 | Gopal | H04B 7/18515 455/13.1 |

(Continued)

*Primary Examiner* — Jae Y Lee
(74) *Attorney, Agent, or Firm* — Polsinelli PC

(57) ABSTRACT

Systems, methods, and non-transitory media are provided for low latency handovers. An example method can include receiving, by a satellite, a schedule of communications between the satellite and one or more gateways; requesting, based on the schedule, a handover from a link between the satellite and a gateway to a different link between the satellite and the gateway or a different gateway; prior to a completion of the handover, processing packets bicasted over the link between the satellite and the gateway and the different link between the satellite and the gateway or the different gateway; performing the handover from the link between the satellite and the gateway to the different link between the satellite and the gateway or the different gateway; and after the handover, transmitting, by the satellite, one or more packets via the different link between the satellite and the gateway or the different gateway.

22 Claims, 16 Drawing Sheets

(56) References Cited

U.S. PATENT DOCUMENTS

| | | | |
|---|---|---|---|
| 2016/0183156 A1* | 6/2016 | Chin | H04L 61/5007 |
| | | | 370/331 |
| 2018/0006711 A1* | 1/2018 | Hreha | H04W 16/28 |
| 2020/0029265 A1* | 1/2020 | Choquette | H04B 7/18541 |
| 2020/0098251 A1* | 3/2020 | Laselva | H04L 45/121 |
| 2020/0204439 A1* | 6/2020 | Scott | H04B 7/18513 |
| 2020/0259558 A1* | 8/2020 | Gokhale | H04W 28/0268 |
| 2020/0322045 A1* | 10/2020 | Scott | H04B 7/18543 |
| 2021/0242934 A1* | 8/2021 | Qiao | H04B 7/18513 |

* cited by examiner

LOW LATENCY SCHEDULE-DRIVEN HANDOVERS

CROSS-REFERENCE TO RELATED APPLICATIONS

This application claims priority to U.S. Provisional Patent Application No. 63/035,461, filed on Jun. 5, 2020, entitled "LOW LATENCY SCHEDULE DRIVEN HANDOVERS", the contents of which are hereby incorporated by reference in their entirety and for all purposes.

TECHNICAL FIELD

The present disclosure generally relates to wireless communications systems and, more specifically, to handovers in wireless communications systems.

BACKGROUND

In wireless communications, a handover (or handoff) can involve a process of transferring a wireless device's access to a network from one communication link or channel to a different communication link or channel. For example, in satellite communications, a handover can involve transferring a satellite communication link to a ground station, user terminal, cell or gateway from one satellite to another satellite or from one beam on a satellite to a different beam on the same satellite. A handover can occur when a wireless device in a communication session needs to transfer the communication session to a different communication link to avoid a loss or interruption of service. In one illustrative example, a handover can occur when a satellite moves outside of a coverage area and a communication link or session between the satellite and a wireless device(s) in the coverage area needs to be transferred to another satellite capable of serving the coverage area. In another illustrative example, a handover can occur when a mobile terminal moves outside the coverage area of its base station or satellite and a handover to another base station or satellite is needed to avoid a loss or interruption of service.

The need in the art for effective handover technologies has steadily increased as device mobility and wireless communications become increasingly prevalent. However, wireless handover technologies often experience perceptible latencies and loss or interruption of service. Moreover, wireless handover technologies generally have limited scalability, flexibility, and efficiency. Unfortunately, such limitations in wireless handover technologies can have significant consequences for the user or subscriber, including abrupt termination of ongoing communication sessions, service degradation, and reduced handover performance. These problems are exacerbated in more complex wireless environments such as satellite-based communication environments.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously explained, there is an increasing need in the art for effective handover technologies for wireless communications. However, wireless handover technologies can experience perceptible latencies and loss or interruption of service. Moreover, wireless handover technologies have generally limited scalability, flexibility, and efficiency. In satellite-based communication systems, handover procedures can face particularly difficult challenges and limitations. The complexity of satellite-based communication systems, the moving velocity of satellites, the relative distances between satellites and satellite terminals, and the beam pointing accuracy associated with the satellites and satellite terminals—among other constraints—can significantly degrade a user's or subscriber's wireless experience, increase handover latencies, and reduce the availability and scalability of wireless services.

Disclosed herein are systems, methods, and computer-readable media for low latency handovers in wireless communication systems. In some examples, the disclosed technologies can provide a schedule-driven handover scheme that enables low latency handovers between satellites and satellite terminals such as, for example, user terminals, satellite gateways, satellite cells, etc. The schedule-driven handover scheme can predict or schedule handover events and/or needs in advance in order to provide seamless, stable, and efficient handovers. The disclosed handover approaches herein can significantly reduce handover latencies and increase the scalability and flexibility of wireless services.

Figure 10A:
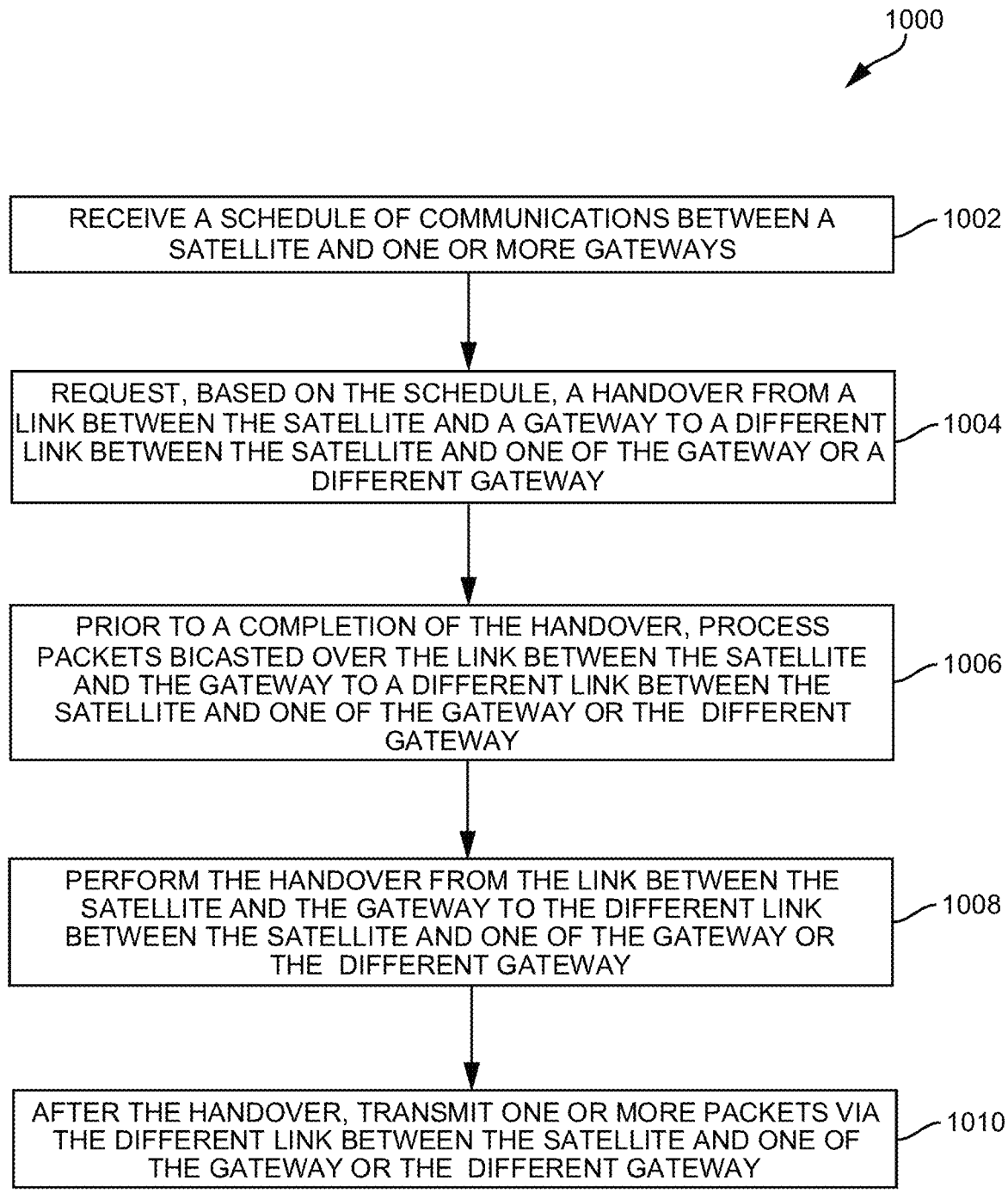
FIGS. 10A and 10B are flowcharts illustrating example methods for performing low latency handovers, in accordance with some examples of the present disclosure.
Figure 10B:
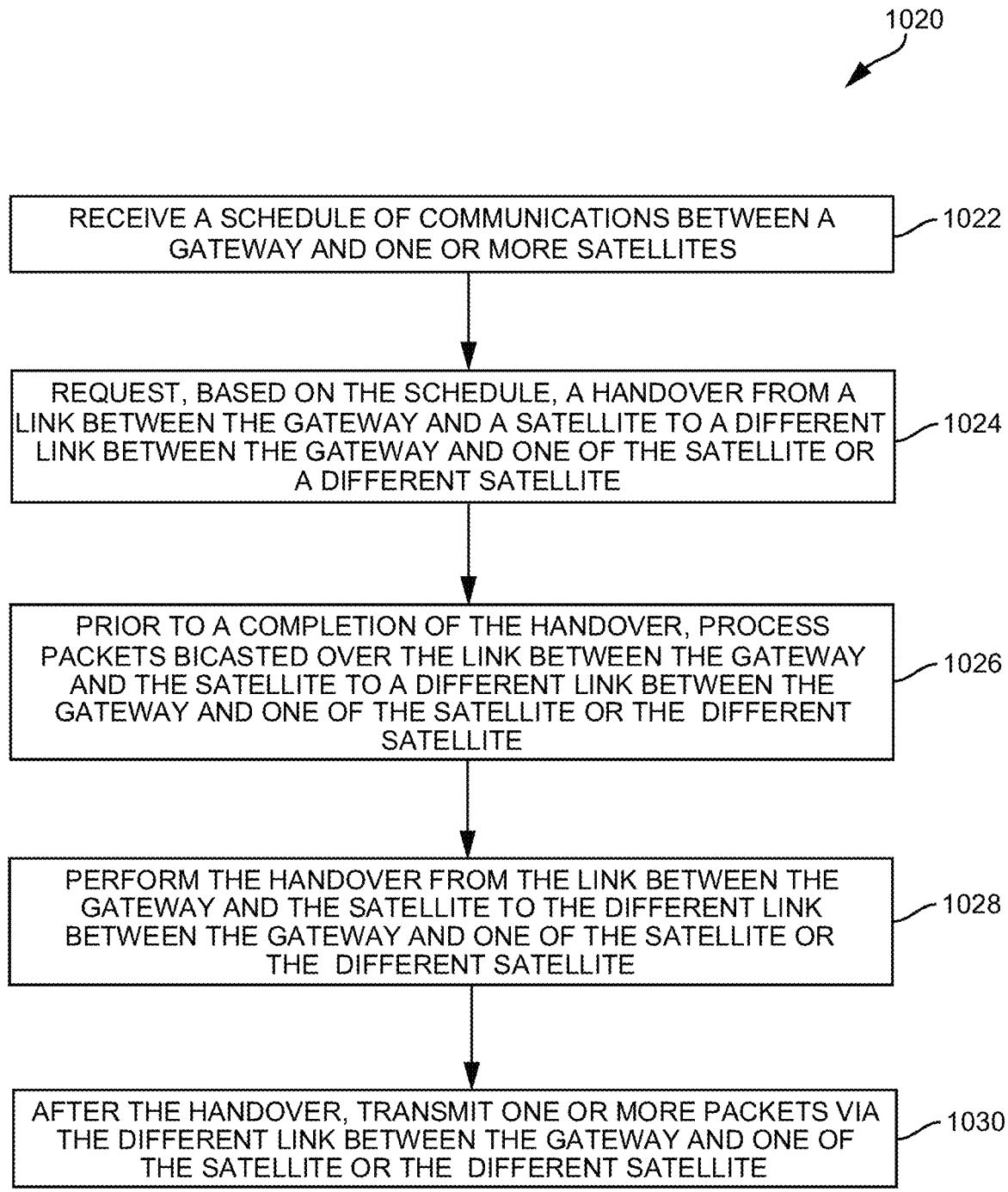
Figure 11:
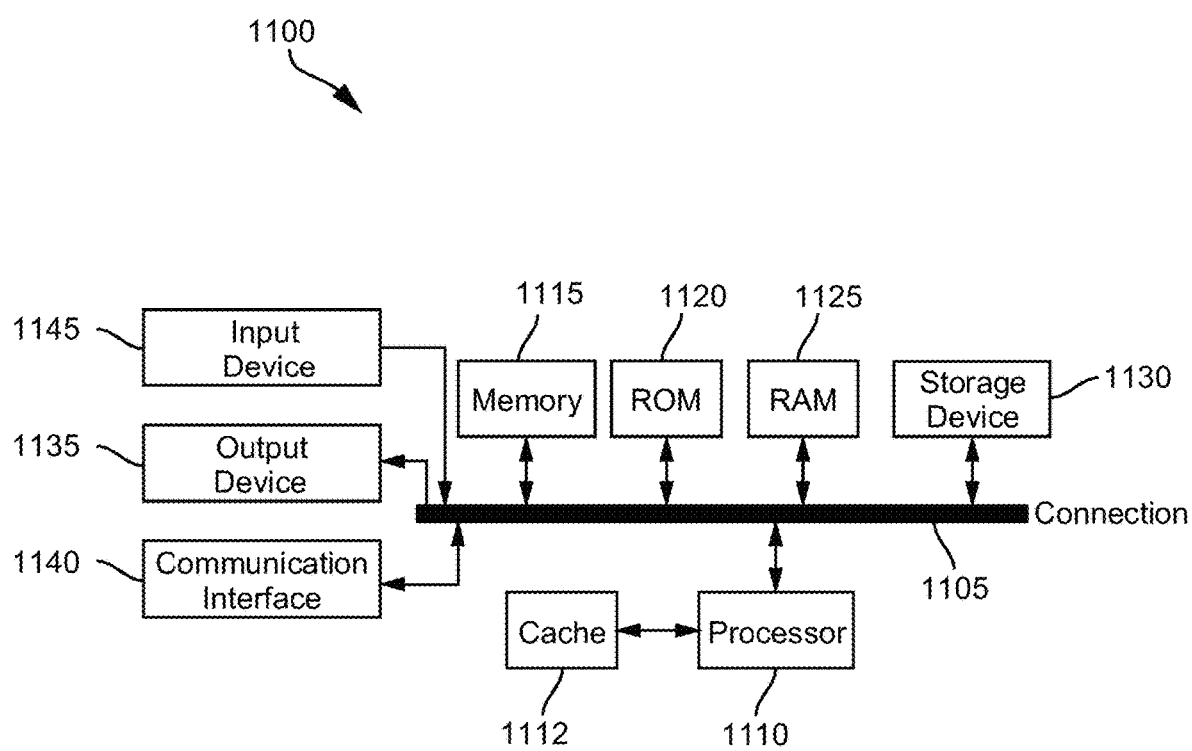
FIG. 11 illustrates an example computing device architecture, in accordance with some examples of the present disclosure.

The present technologies will be described in the following disclosure as follows. The discussion begins with a description of example systems and technologies for wireless communications and wireless handovers, as illustrated in FIGS. 1A through 9. A description of example methods for performing a low latency handover, as illustrated in FIGS. 10A and 10B, will then follow. The discussion concludes with a description of an example computing device architecture including example hardware components suitable for performing multi-user uplink time synchronization, as illustrated in FIG. 11. The disclosure now turns to FIG. 1A.

Figure 1A:
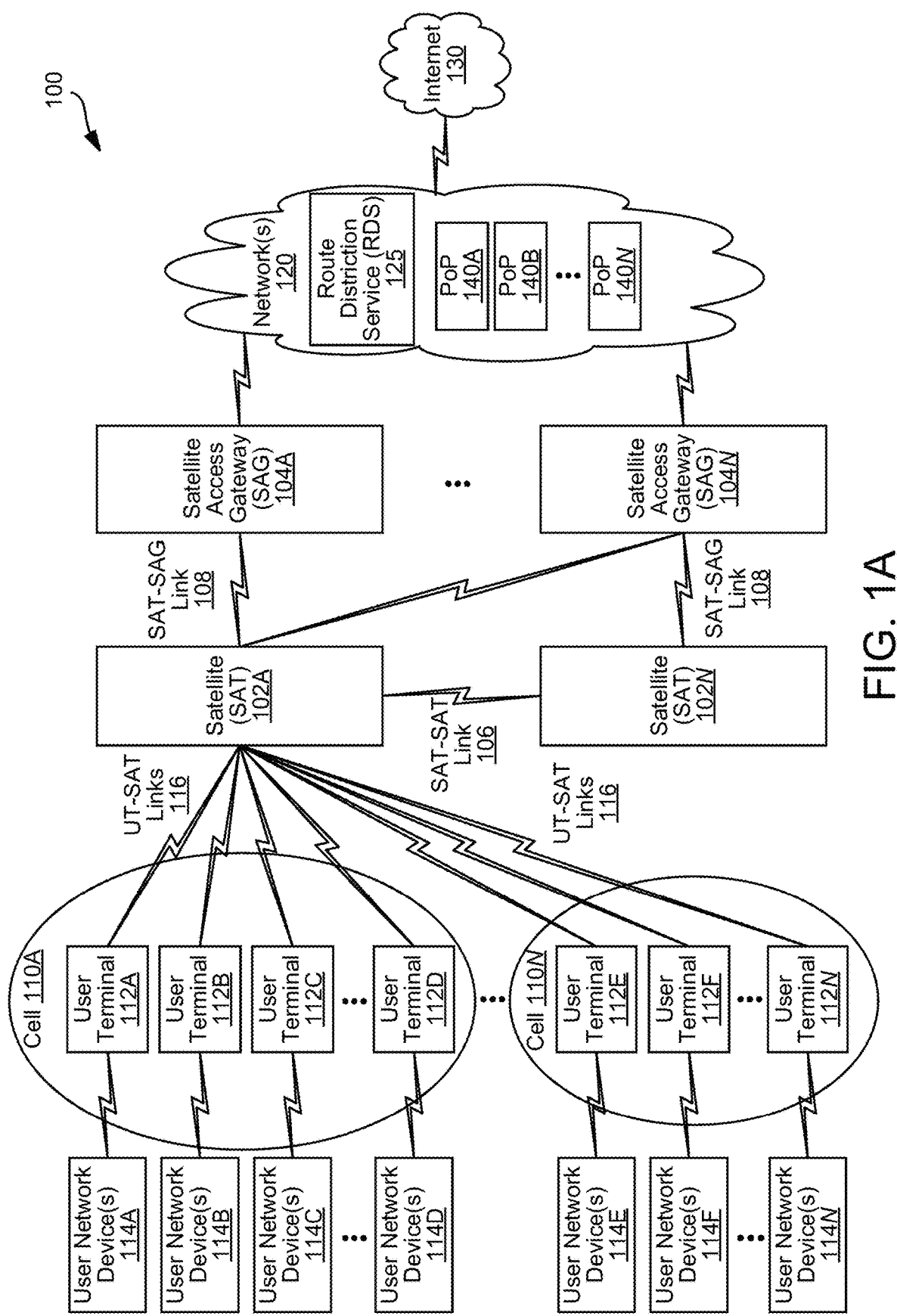
FIG. 1A is a simplified diagram illustrating an example wireless communication system, in accordance with some examples of the present disclosure.

FIG. 1A is a block diagram illustrating an example wireless communication system 100, in accordance with some examples of the present disclosure. In this example, the wireless communication system 100 is a satellite-based communication system and includes one or more satellites (SATs) 102A-102N (collectively "102"), one or more satellite access gateways (SAGs) 104A-104N (collectively "104"), user terminals (UTs) 112A-112N (collectively "112"), user network devices 114A-114N (collectively "114"), one or more networks 120, a route distribution service (RDS) 125, and one or more point-of-presence (PoP) sites 140A-N (collectively "140") in communication with the Internet 130 (or network).

The SATs 102 can include orbital communications satellites capable of communicating (directly and/or indirectly) with other wireless devices or networks (e.g., 104, 112, 114, 120, 130) via radio telecommunications signals. The SATs 102 can provide radio communication channels, such as radio frequency (RF) links (e.g., 106, 108, 116), between the SATs 102 and other wireless devices located at different locations on Earth and/or in orbit. In some examples, the SATs 102 can establish communication channels for Internet, radio, television, telephone, radio, military, and/or other applications.

The user terminals 112 can include any electronic devices and/or physical equipment that support RF communications to and from the SATs 102. Similarly, the SAGs 104 can include gateways or earth stations that support RF communications to and from the SATs 102. The user terminals 112 and the SAGs 104 can include antennas for wirelessly communicating with the SATs 102. The user terminals 112 and the SAGs 104 can also include satellite modems for modulating and demodulating radio waves used to communicate with the SATs 102. In some examples, the user terminals 112 and/or the SAGs 104 can include one or more server computers, routers, ground receivers, earth stations, user equipment, antenna systems, communication nodes, base stations, access points, and/or any other suitable device or equipment. In some cases, the user terminals 112 and/or the SAGS 104 can perform phased-array beam-forming and digital-processing to support highly directive, steered antenna beams that track the SATs 102. Moreover, the user terminals 112 and/or the SAGs 104 can use one or more frequency bands to communicate with the SATs 102, such as the Ku and/or Ka frequency bands. In some cases, any of the user terminals 112, SATs 102, and/or SAGs 104 can also have multiple beams connecting to multiple entities (e.g., other user terminals, SATs, SAGs, etc.) simultaneously.

The user terminals 112 can be used to connect the user network devices 114 to the SATs 102 and ultimately the Internet 130. The SAGs 104 can be used to connect the one or more PoP sites 140, the one or more networks 120 and the Internet 130 to the SATs 102. For example, the SAGs 104 can relay communications from the PoP sites 140, the one or more networks 120 and/or the Internet 130 to the SATs 102, and communications from the SATs 102 (e.g., communications originating from the user network devices 114, the user terminals 112, or the SATs 102) to the PoP sites 140, the one or more networks 120 and/or the Internet 130.

The user network devices 114 can include any electronic devices with networking capabilities and/or any combination of electronic devices such as a computer network. For example, the user network devices 114 can include routers, network modems, switches, access points, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles, robotic devices, user networks, sensors, end-user devices, etc.

Each PoP site from the one or more PoP sites 140 can include an interface and/or access point to the Internet 130. Moreover, each PoP site can include one or more servers, routers, switches, multiplexers, data centers, base stations, modems, carrier facilities, and/or any other network equipment. In some cases, the one or more PoP sites 140 can be part of, or implemented by, one or more Internet Service Providers (ISPs), one or more external networks, one or more telecommunication companies, content delivery networks, and/or any other company, facility, and/or network. In some examples, the one or more PoP sites 140 can be part of, or hosted in, the one or more networks 120. In other examples, the one or more PoP sites 140 can be separate from the one or more networks 120.

The RDS 125 can include a network topology service configured to distribute communication schedules to devices in the wireless communication system 100 such as, for example, the UTs 112, the SATs 102, the SAGs 104, the PoP sites 140, etc. In some examples, the schedules can define what entities (e.g., 102, 104, 112, 140) should communicate with what other entities, when certain entities should communicate with certain other entities, etc. For example, a schedule can indicate that UT 112A should communicate with SAT 102B and/or that SAT 102A should not communicate with UT 112A, and can define one or more time slots and/or radio frames in which UT 112A (and any other UTs) and SAT 102B should communicate with each other. In some cases, the schedule can indicate that SAT 102B should communicate with one or more UTs in one or more cells (e.g., cell 110A, cell 110N), such as UT 112A, and can define one or more time slots and/or radio frames for one or more communications between the SAT 102B and the one or more UTs.

In some cases, the schedules can indicate which SAT, SAG, UT, and/or PoP site should be included in, or part of, a communication link and/or communication session between a UT and a SAT. In some cases, the schedules can also indicate one or more time slots to the SAT, SAG, UT, and/or Pop site to communicate in. Moreover, in some cases, a schedule can identify a handover and/or handover period that one or more entities (e.g., 102, 104, 112, 140) should perform to transfer a communication link and/or session from one entity to another (e.g., from one SAT to another, from one SAG to another, from one PoP site to another, etc.).

The RDS 125 can generate schedules in advance (e.g., prior to a handover, a communication link, a communication session, an event, etc.) and distribute the schedules to one or more devices. In some examples, the RDS 125 can generate schedules based on topology information and/or information about the devices in the environment. For example, the RDS 125 can generate schedules based on ephemeris data (e.g., velocity, position, etc.) of the SATs 102; location information associated with the UTs 112, SAGs 104, and/or PoP sites 140; information about asset availability at one or more times (e.g., availability of UTs, SATs, SAGs, PoP sites, etc.); information about a current topology of the wireless communication system 100; information about current communication sessions and/or links in the wireless communication system 100, network conditions (e.g., latency, bandwidth, traffic loads, resource failures, etc.); quality-of-service (QoS) requirements associated with one or more devices; and/or any other factor(s) for managing traffic, sessions and/or communication links in the wireless communication system 100.

The one or more networks 120 can include one or more networks and/or data centers. For example, the one or more networks 120 can include a public cloud, a private cloud, a hybrid cloud, an ISP, a backbone or core network, an external network, an enterprise network, a service provider network, an on-premises network, and/or any other network. Moreover, the one or more networks 120 can have connectivity to the Internet 130. In some cases, the one or more networks 120 can have connectivity to the Internet 130 through the one or more PoP sites 140. In other cases, the one or more networks 120 can have connectivity to the Internet 130 with or without the one or more PoP sites 140.

In some cases, the SATs 102 can establish communication links between the SATs 102 and the user terminals 112. For example, SAT 102A can establish communication links 116 between the SAT 102A and the user terminals 112A-D and/or 112E-N. The communication links 116 can provide communication channels between the SAT 102A and the user terminals 112A-D and/or 112E-N. In some examples, the user terminals 112 can be interconnected (e.g., via wired and/or wireless connections) with the user network devices 114. Thus, the communication links between the SATs 102 and the user terminals 112 can enable communications between the user network devices 114 and the SATs 102. In some examples, each of the SATs 102A-N can serve user terminals 112 distributed across and/or located within one or more cells 110A-110N (collectively "110"). The cells 110 can represent geographic areas served and/or covered by the SATs 102. For example, each cell can represent an area corresponding to the satellite footprint of radio beams propagated by a SAT. In some cases, a SAT can cover a single cell. In other cases, a SAT can cover multiple cells. In some examples, a plurality of SATs 102 can be in operation simultaneously at any point in time (also referred to as a satellite constellation). Moreover, different SATs can serve different cells and sets of user terminals.

The SATs 102 can also establish communication links 106 with each other to support inter-satellite communications. Moreover, the SATs 102 can establish communication links 108 with the SAGs 104. In some cases, the communication links between the SATs 102 and the user terminals 112 and the communication links between the SATs 102 and the SAGs 104 can allow the SAGs 104 and the user terminals 112 to establish a communication channel between the user network devices 114, the one or more networks 120, the one or more PoP sites 140, and ultimately the Internet 130. For example, the user terminals 112A-D and/or 112E-N can connect the user network devices 114A-D and/or 114E-N to the SAT 102A through the communication links 116 between the SAT 102A and the user terminals 112A-D and/or 112E-N. The SAG 104A can connect the SAT 102A to a PoP site 140A on the one or more networks 120, which can connect the SAGs 104A-N to the Internet 130. Thus, the communication links 108 and 116, the SAT 102A, the SAG 104A, the user terminals 112A-D and/or 112E-N, the PoP sites 140 and the one or more networks 120 can allow the user network devices 114A-D and/or 114E-N to connect to the Internet 130.

In some examples, a user can initiate an Internet connection and/or communication through a user network device from the user network devices 114. The user network device can have a network connection to a user terminal from the user terminals 112, which it can use to establish an uplink (UL) pathway to the Internet 130. The user terminal can wirelessly communicate with a particular SAT from the SATs 102, and the particular SAT can wirelessly communicate with a particular SAG from the SAGS 104. The particular SAG can be in communication (e.g., wired and/or wireless) with the one or more PoP sites 140 and/or the one or more networks 120 and, by extension, the Internet 130. Thus, the particular SAG can enable the Internet connection and/or communication from the user network device to the one or more PoP sites 140 and networks 120 and, by extension, the Internet 130.

In some cases, the particular SAT and SAG can be selected based on signal strength, line-of-sight, and the like. If a SAG is not immediately available to receive communications from the particular SAT, the particular SAG can be configured to communicate with another SAT. The second SAT can in turn continue the communication pathway to a particular SAG. Once data from the Internet 130 is obtained for the user network device, the communication pathway can be reversed using the same or different SAT and/or SAG as used in the UL pathway.

In some examples, the communication links (e.g., 106, 108, and 116) in the wireless communication system 100 can operate using orthogonal frequency division multiple access (OFDMA) via both time domain and frequency domain multiplexing. OFDMA, also known as multicarrier modulation, transmits data over a bank of orthogonal subcarriers harmonically related by the fundamental carrier frequency. Moreover, in some cases, for computational efficiency, fast Fourier transforms (FFT) and inverse FFT can be used for modulation and demodulation.

While the wireless communication system 100 is shown to include certain elements and components, one of ordinary skill will appreciate that the wireless communication system 100 can include more or fewer elements and components than those shown in FIG. 1A. For example, the wireless communication system 100 can include, in some instances, networks, cellular towers, communication hops or pathways, network equipment, and/or other electronic devices that are not shown in FIG. 1A.

Figure 1B:
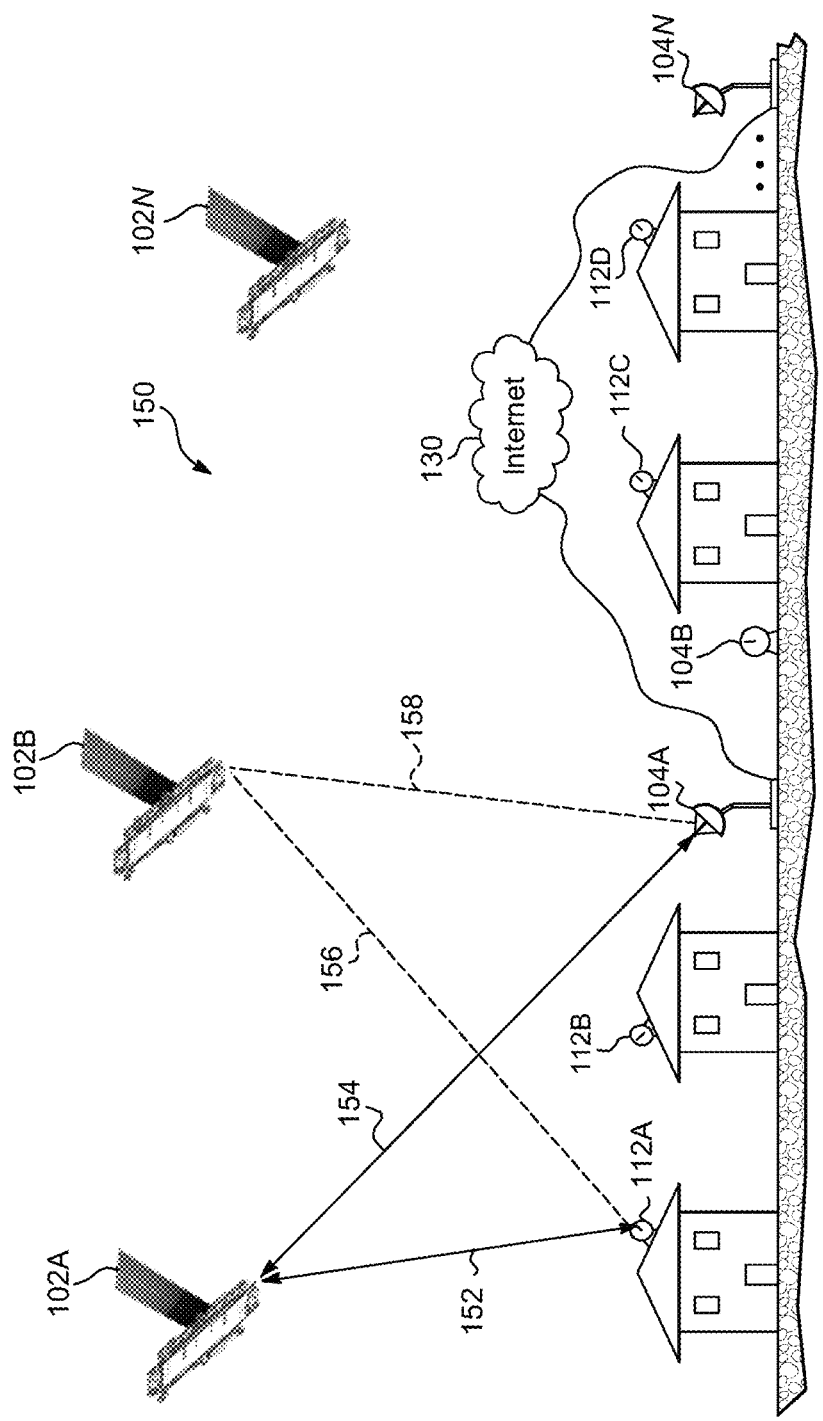
FIG. 1B is a simplified diagram illustrating an example of a satellite-based communications environment, in accordance with some examples of the present disclosure.

FIG. 1B is a diagram illustrating an example of a satellite-based communications environment 150, in accordance with various aspects of the present disclosure. The satellite-based communications environment 150 can include a plurality of SATs 102A-N orbiting Earth in, for example and without limitation, a non-geostationary orbit (NGO) constellation. In this example, three SATs (e.g., SAT 102A, 102B, and 102N) are shown for illustrative purposes. However, one of ordinary skill in the art will recognize that other examples can include more or less SATs than those shown in FIG. 1B.

The satellite-based communications environment 150 includes ground or Earth-based equipment configured to communicate with the SATs 102A-N. In some examples, such equipment can include user terminals (UTs) 112A-N and gateways 104A-N. Each of the UTs 112A-N can be associated with a particular user. The UTs 112A-N can be configured to serve as a conduit between particular user networks and/or devices (e.g., 114A-N) and at least one of the SATs 102A-N in communication range of the UTs 112A-N, such that the particular user networks and/or device can have access to a network, such as the Internet 130. Each of the UTs 112A-N is particularly positioned in proximity to an associated user network and/or device. For example, each of the UTs 112A-N can be located on a respective user's building's roof, a yard of the user's building, etc. A variety of other locations are also contemplated for the UTs 112A-N.

At any given time, a particular SAT (102A, 102B, 102N) can be in communication with a given UT from the UTs 112A-N to facilitate a communication link to the network 130. For instance, a user device in proximity to UT 112A (e.g., and connected together via a wireless connection) requests to access the network 130 (e.g., request a web page). UT 112A can establish a communication link 152 to the SAT 102A and transmit the data request. SAT 102A, in response, can establish a communication link 154 with an accessible gateway 104A to relay the data request. The gateway 104A can have a connection (e.g., wired or wireless) to the network 130.

The data associated with the request (e.g., the requested web page) can be returned in the reverse path, from the gateway 104A, communication link 154, SAT 102A, communication link 152, and UT 112A, to the originating user device. If SAT 102A moves out of position relative to UT 112A before the requested data can be provided to the UT 112A (or otherwise becomes unavailable), then gateway 104A can establish a communication pathway 156, 158 with a different SAT, such as SAT 102B, to provide the requested data.

In some aspects, one or more of the gateways 104A-N can include repeaters that lack a wired connection to the network 130. A repeater can be configured to relay communications to and/or from a SAT that is a different SAT from the one that directly communicates with a UT or gateway. A repeater can be configured to be part of the communication pathway between a UT and gateway. A repeater may be accessed in cases where a SAT does not have access to a gateway, and thus has to send its communication to another SAT that has access to a gateway via the repeater. Repeaters can be located terrestrially, on water (e.g., on ships or buoys), in airspace below satellite altitudes (e.g., on an airplane or balloon), and/or other Earth-based locations. Accordingly, the gateways 104A-N can also be referred to as Earth-based network nodes, Earth-based communication nodes, and/or the like. In some aspects, transmitter and receiver systems can be included in each UT, SAT, and gateway of the satellite-based communications environment 150.

While the satellite-based communications environment 150 is shown to include certain elements and components, one of ordinary skill will appreciate that the satellite-based communications environment 150 can include more or fewer elements and components than those shown in FIG. 1B. For example, the satellite-based communications environment 150 can include, in some instances, networks, cellular towers, communication hops or pathways, network equipment, and/or other electronic devices that are not shown in FIG. 1B.

Figure 1C:
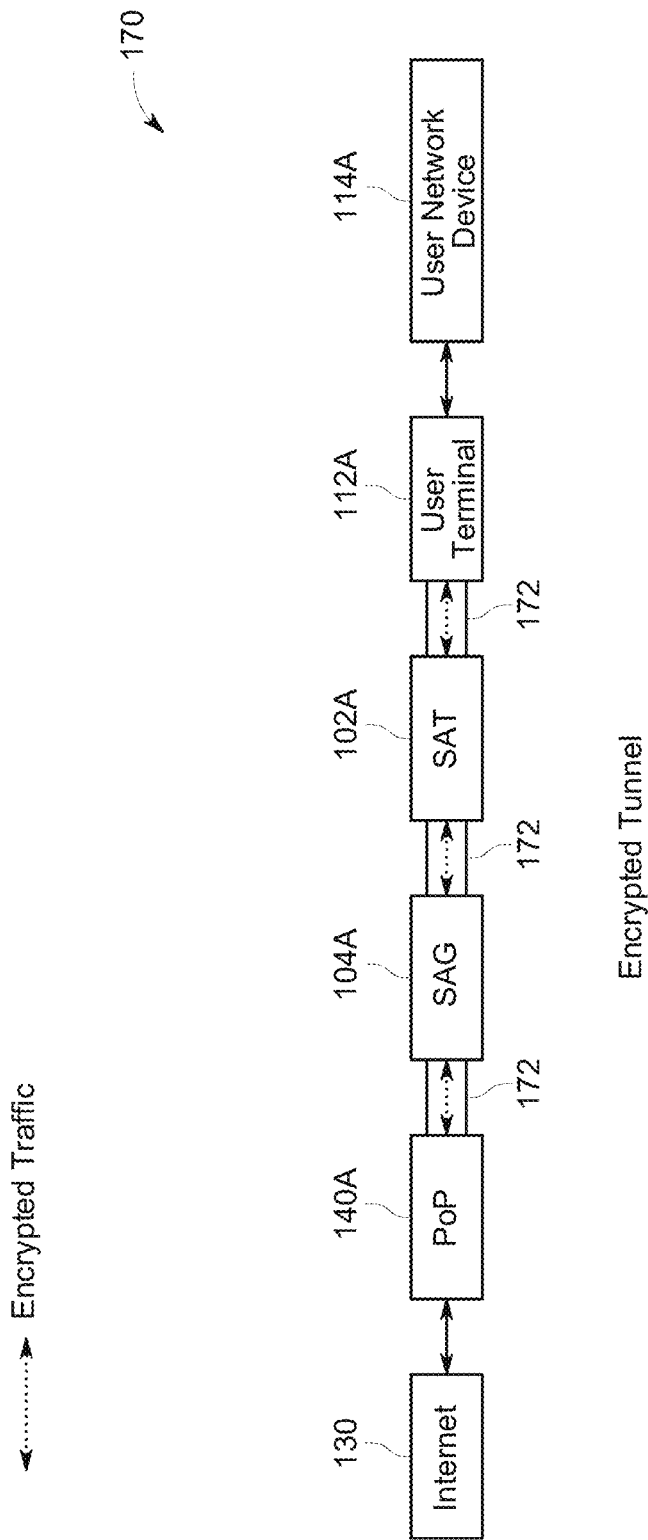
FIG. 1C is a simplified diagram illustrating an example virtual link to the Internet in a satellite-based communication system, in accordance with some examples of the present disclosure.

FIG. 1C is a diagram illustrating an example virtual communication link 170 to the Internet 130 in a satellite-based communication system. The virtual communication link 170 in this example connects a user network device 114A to the Internet 130. Moreover, the virtual communication link 170 can include an encrypted tunnel 172 between a user terminal 112A connected to the user network device 114A and a PoP site 140A providing access to the Internet 130. The encrypted tunnel 172 can encrypt packets communicated between the user terminal 112A and the PoP site 140A for increased privacy and security.

As previously explained, to access the Internet 130, the user network device 114A can establish a connection with the user terminal 112A, which can communicate with the SAT 102A and ultimately provide access the Internet 130. The user terminal 112A can send packets from the user network device 114A to the SAT 102A through the encrypted tunnel 172. The SAT 102A can forward such packets to the SAG 104A through the encrypted tunnel 172. The SAG 104A can route the packets to the PoP site 140A, which can then route the packets to the Internet 130 and provide Internet access. Packets from the Internet 130 to the user network device 114A can similarly travel along each hop in the virtual communication link 170 (e.g., the PoP site 140A, the SAG 104A, the SAT 102A, and the UT 112A) in the reverse direction.

To route packets between the various components in the virtual communication link 170, each component can have an assigned routing identifier and/or address (e.g., Internet Protocol (IP) address). The routing identifiers and/or addresses of the various components can be used to make routing decisions, route or forward packets to their destinations, perform path or cost computations, monitor a topology and/or network conditions, identify each hop along a path to a packet destination, etc. In some examples, a routing identifier can include a network label that one or more components in the virtual communication link 170 can use to identify the hop/component associated with the routing identifier, route/forward packets to that hop/component, and/or many any routing decisions.

Packets communicated between the SAT 102A and the UT 112A can be transmitted within radio frames. Moreover, in some cases, multiple user terminals may share a same radio frame for uplink transmissions to the SAT 102A. The use of radio frames to communicate between satellites and user terminals and the sharing of radio frames by multiple user terminals for uplink transmissions to satellites can significantly complicate wireless and handover services in satellite-based communication systems. However, the approaches herein can provide scheduling, timing, and signal processing techniques to support stable, efficient, and low latency wireless services and handovers.

As referenced herein, a radio frame can represent and/or include a time window for one or more downlink transmissions from a satellite to user terminals, or a time window for one or more uplink transmissions from user terminals to a satellite. A radio frame as referenced herein can also represent and/or include one or more signals and/or data (e.g., one or more beams, radio bursts, packets, etc.) transmitted within the time window for the one or more uplink transmissions or the one or more downlink transmissions. For example, a radio frame can include a beam with data transmitted by a satellite to user terminals within a time window associated with the radio frame, or one or more radio bursts received by the satellite from the user terminals within the time window associated with the radio frame.

Figure 2:
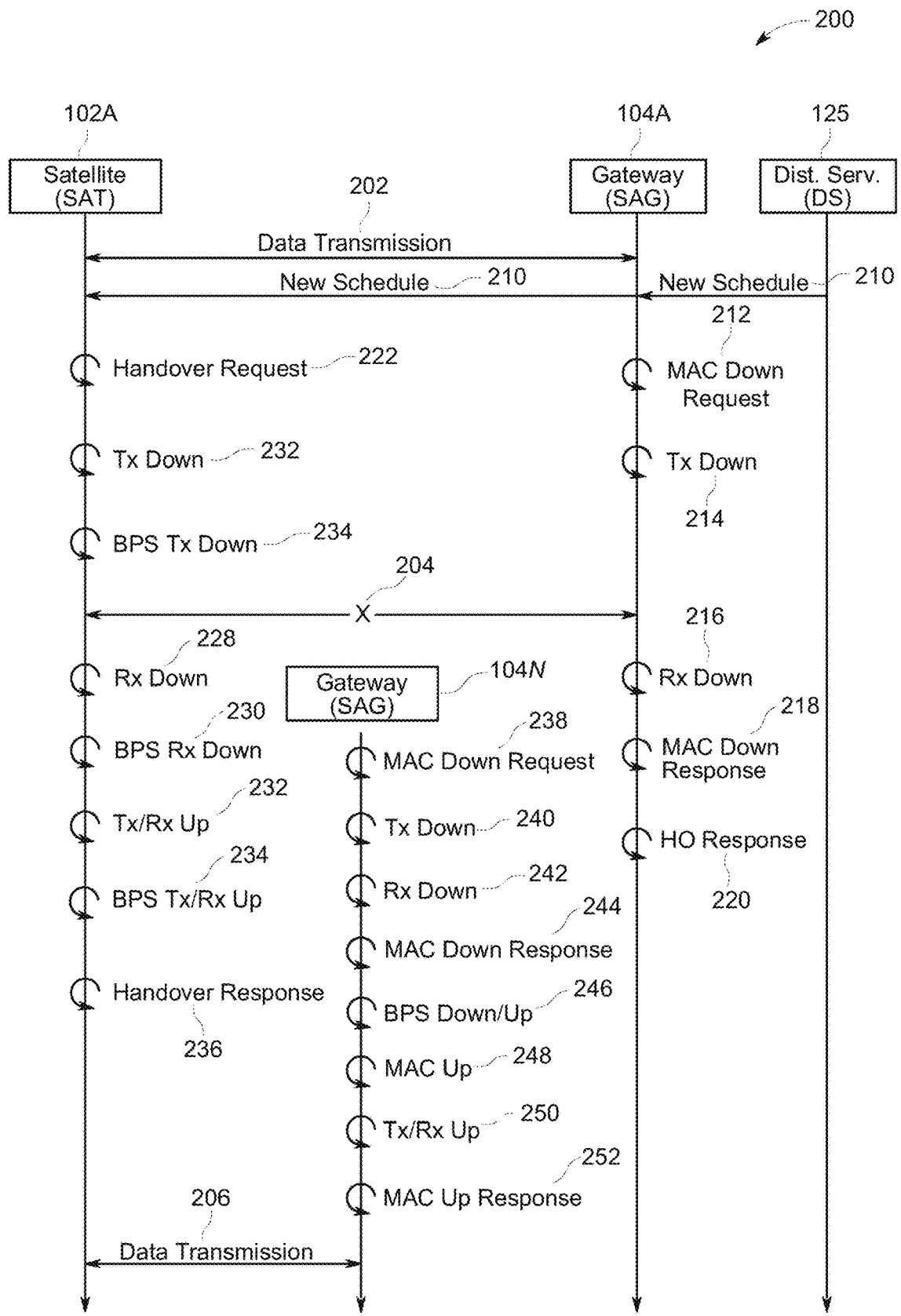
FIG. 2 illustrates an example message flow between a satellite and gateways for a handover between the gateways and a satellite, in accordance with some examples of the present disclosure.

FIG. 2 illustrates an example message flow 200 between SAT 102A and SAGs 104A and 104N for a handover between SAT 102A and SAGs 104A and 104N. The message flow 200 can be implemented for a handover on a downlink direction or an uplink direction between a satellite (e.g., SAT 102A) serving a user terminal and gateways (SAGs 104A and 104N) used to support user terminal communications, as further described below with respect to FIGS. 4 through 8. Moreover, the handover can be used to serve the user terminal with a different satellite or with a different beam on the same satellite. In some examples, the handover can relate to communications to/from the user terminal through a satellite-based communication link, such as virtual communication link 170.

In some cases, the handover can be triggered by a schedule generated in advance, which can (pro-actively) anticipate and/or address a needed change in service to the user terminal from one satellite and gateway to the satellite (from the same beam on the satellite or a different beam on the satellite) and a different gateway, or from the satellite and gateway to a different satellite and the gateway. In some examples, the handover can be triggered when, or the schedule can trigger the handover in advance when, a satellite serving a user terminal and/or cell and connected to a gateway moves outside of a range of the gateway, the user terminal and/or the cell, or experiences signal, connectivity, and/or performance issues. In other examples, the handover can be triggered based on topology changes or events, load balancing rules/conditions, resource optimization efforts, etc.

As further described herein, the handover can be based on a schedule generated in advance and provided in advance (e.g., via a control plane) to one or more hops along a communication link (e.g., SAT 102A, the SAG 104A, the UT 112A, and/or the PoP site 140A in the virtual communication link 170). Moreover, when performing a handover between a satellite and different gateways, packet bicasting can be used to prevent loss of packets between the satellite, the gateways, and the user terminal. In some examples, time division multiplexing (TDM) can be used when performing a handover involving a satellite serving multiple cells.

In the example message flow 200, a handover is performed to transfer a communication link 202 between SAT 102A and SAG 104A to SAG 104N, and establish a new communication link 206 between SAT 102A and SAG 104N. Prior to the handoff, the SAT 102A and the SAG 104A can fetch and/or receive (e.g., via a connection manager (CM) as further described below) a schedule 210 from RDS) 125. The RDS 125 can maintain, identify, collect, and/or share topology and scheduling information to devices on a satellite-based environment, such as user terminals, satellites, gateways, PoP sites, etc. In some examples, the RDS 125 can be a system or component on the ground, such as a server, a controller, a service (e.g., a cloud service, a network service, a microservice, etc.), a virtual machine, a software container, etc.

In some cases, the SAT 102A and SAG 104A can receive the schedule 210 from the RDS 125 in advance (e.g., prior to a handover, a communication session, a communication link, an event, etc.). Moreover, in some examples, the SAT 102A and SAG 104A can periodically fetch a new schedule.

The schedule 210 can define what entities should communicate with what other entities, when certain entities should communicate with certain other entities, etc. For example, the schedule 210 can indicate that SAT 102A should communicate with SAG 104N as opposed to SAG 104A, and can define one or more time slots and/or radio frames in which SAT 102A should communicate with SAG 104N. The SAT 102A and SAG 104A can accordingly initiate the handover to establish the new communication link 206 between the SAT102A and the SAG 104N. In some cases, the schedule 210 can indicate which SAT, SAG, UT, and/or PoP site should be included in, or part of, a communication link and/or communication session between a SAT, an SAG, a UT and/or a PoP site. In some cases, the schedule 210 can also indicate one or more time slots to the SAT, SAG, UT, and/or Pop site to communicate in.

Based on the schedule 210, the SAT 102A can process a handover (HO) request 222 to initiate a handoff from SAG 104A to SAG 104N. For example, the SAT 102A can generate the handover request 222 via a connection manager (CM) at the SAT 102A, and process the handover request 222 at layer 3 (L3) and/or L2 (e.g., via the upper media access control (UMAC) layer of the MAC sub-layer). The handover request 222 can request a handover from SAG 104A to SAG 104N to establish the new communication link 206 between the SAT 102A and the SAG 104N. In some examples, the new communication link 206 can be established in the handoff by transferring the communication link 202 from the SAT 102A and the SAG 104A to the SAT 102A and the SAG 104N.

In some cases, the handover request 222 can include information about the new SAG (e.g., SAG 104N), a time and/or time slot for the handoff, a beam on the SAT 102A for the handoff, and/or any other information about the SAT 102A, the SAG 104A, the SAG 104N, the handoff, and/or the schedule for the handoff.

After the handover request 222 and prior to the handoff, the SAT 102A can initiate a transmit (Tx) takedown process 224 to bring down (or change) the Tx connections/interfaces at the MAC sub-layer and L1 layer (e.g., the physical layer) and stop transmitting packets to the SAG 104A. The SAT 102A can also issue a beam pointing service (BPS) down command 226 to bring down (or change) Tx beam pointing (beamforming) associated with the SAG 104A.

At the SAG 104A, the SAG 104A can initiate a MAC down instruction 212 to trigger the MAC sub-layer to bring down (or change) Tx and Rx (Receive) connections/interfaces at the MAC sub-layer and the L1 layer and stop transmitting and receiving packets to and from the SAT 102A. In some examples, the MAC down instruction 212 can include a MAC down request sent by a connection manager to the MAC sub-layer to initiate a MAC down process. The MAC down request can include a corresponding time and/or time interval, information about the SAT 102A, information about Tx and/or Rx communications between the SAG 104A and the SAT 102A, etc.

Based on the MAC down instruction 212, the SAG 104A can issue (e.g., via L1 and L2) a Tx down command 214 to bring down (or change), at L1 and the MAC sublayer, Tx connections/interfaces associated with the SAT 102A. The SAG 104A and the SAT 102 taking down (or changing) Tx connections/interfaces at L1 and the MAC sublayer and the SAT 102A taking down (or changing) a Tx BPS can result in a terminated communication link 204 between the SAT 102A and the SAG 104A.

After the terminated communication link 204, the SAG 104A can perform an Rx down process 216 to bring down (or change) Rx connections/interfaces at L1 and the MAC sublayer. In some cases, the SAG 104A can then clear a MAC buffer which can include packets to and/or from the SAT 102A. The SAG 104A can issue a MAC down response 218 to inform a connection manager the results of the MAC down process triggered by the MAC down instruction 212. The SAG 104A can also perform a BPS down process 220 to bring down (or change) beam pointing at the SAG 104A for communications with the SAT 102A. In some cases, the BPS down process 220 can include a BPS down request issued by a connection manager to a BPS at the SAG 104A and a BPS down confirmation issued by the BPS to the connection manager.

At the SAT 102A, the SAT 102A can perform an Rx down process 228 to bring down (or change) Rx connections/interfaces and stop receiving packets from the SAG 104A. The Rx down process 228 can bring down (or change) Rx connections/interfaces at L1 and the MAC sublayer. The SAT 102A can also perform a BPS Rx down process 230 to bring down (or change) Rx beam pointing.

The SAT 102A can then perform a Tx/Rx up process 232 to bring up Rx and Tx at the L2 and L1 layers for communications with the SAG 104N. The SAT 102A can also issue a BPS Tx/Rx up command 234 to (e.g., to a BPS) to bring up BPS Tx/Rx for communications with the SAG 104N. The SAT 102A can then generate/provide a handoff response 236 (e.g., from L2 to the CM). The handoff response 236 can indicate that the SAT 102A is ready for, and/or has enabled, a handoff to the SAG 104N. Alternatively, the handoff response 236 can indicate if any errors or failures occurred that may prevent the handoff from successfully occurring.

In addition, to establish the new communication link 206, the SAG 104N can generate a MAC down instruction 238 to instruct the MAC sublayer to bring down (or change) Tx/Rx connections/interfaces. The SAG 104N can then perform a Tx down process 240 to bring down (or change) Tx connections/interfaces at L1 and the MAC sublayer. In some cases, the SAG 104N can also clear the MAC buffer, which can include packets received prior to the handoff. At this point, the SAG 104N can terminate a connection to a previous SAT that the SAG 104N was connected to prior to the handoff.

The SAG 104N can also perform an Rx down process 242 to bring down (or change) Rx connections/interfaces at L1 and the MAC sublayer to stop receive packets from a previous SAT. The SAG 104N can issue a MAC down response 244 to the MAC down instruction 238, indicating that the Tx and Rx connections/interfaces have been taken down (or changed).

The SAG 104N can perform a BPS down/up process 246 to bring down beam pointing for the previous SAT and bring up beam pointing (or to change beam pointing) for the SAT 102A. The SAG 104N can also generate a MAC up instruction 248 and a Tx/Rx up process 250 to trigger a MAC sublayer to bring up Tx and Rx connections/interfaces at L1 and the MAC sublayer, for communications with the SAT 102A. In some cases, during this period, the SAG 104N can buffer packets it receives from the SAT 102A until the handover is complete. The SAG 104N can then issue a MAC up response 252 (e.g., from L2 to a CM) to finalize the handover and establish the new communication link 206 with the SAT 102A. The SAT 102A and SAG 104N can seamlessly establish the new communication link 206 and the SAT 102A can continue communications via the new communication link 206 with the SAG 104N.

Figure 3A:
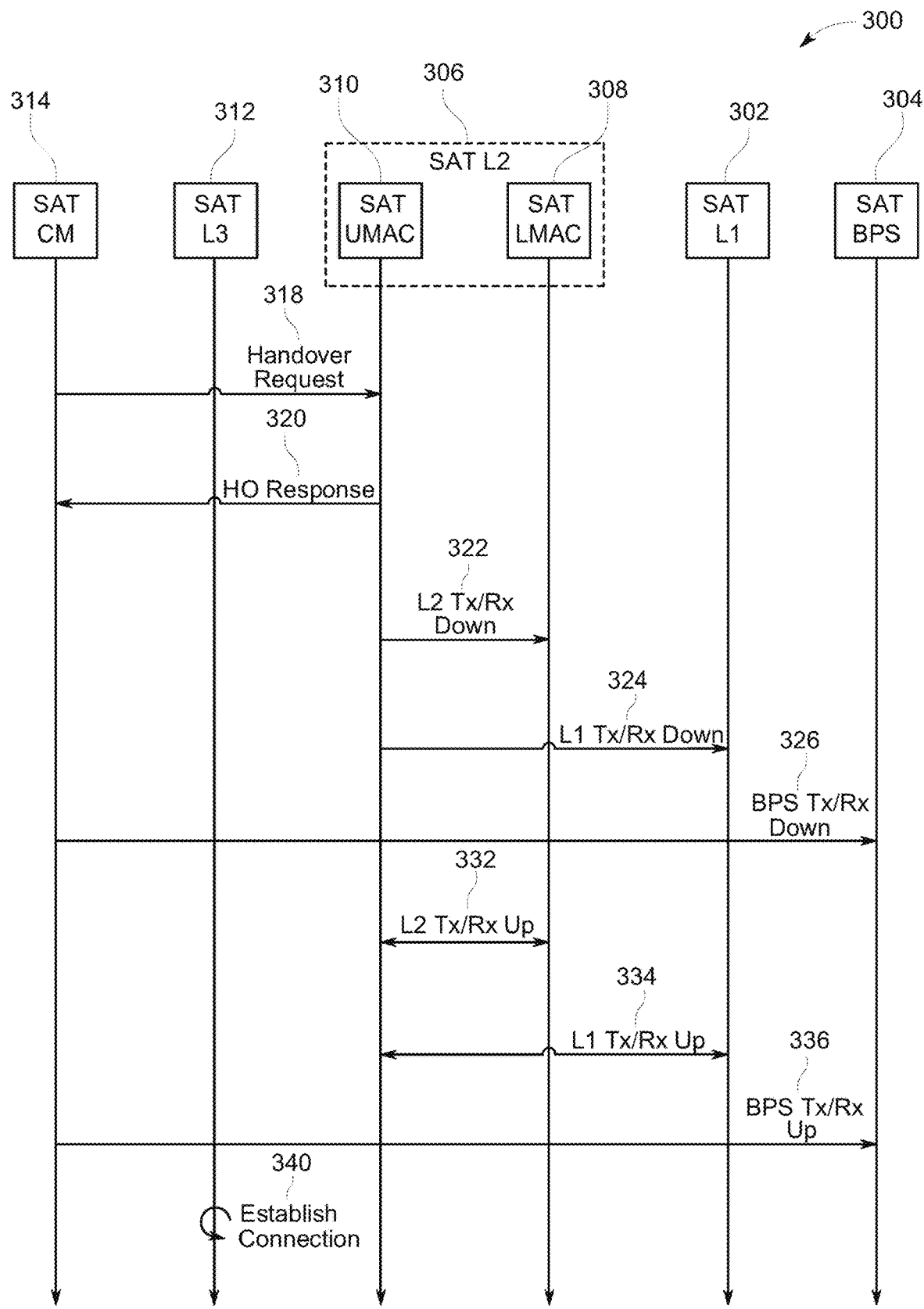
FIG. 3A is a diagram illustrating an example satellite message flow for a schedule-driven handover, in accordance with some examples of the present disclosure.

FIG. 3A is a diagram illustrating an example SAT message flow 300 at SAT 102A for the handover from the message flow 200 shown in FIG. 2. In the example SAT message flow 300, prior to the handoff, a CM 314 can send a handover request 318 to the L3 layer (e.g., the network layer) 312 and the upper media access control (UMAC) sub-layer 310 of the L2 layer 306. The CM 314 can generate the handover request 318 based on a schedule (e.g., 210) it fetches and/or receives from a distribution service (e.g., RDS 125). The handover request 318 can request a handover from SAG 104A to SAG 104N to establish a new communication link between the SAT 102A and the SAG 104N. In some examples, the new communication link can be established in the handoff by transferring a current communication link between the SAT 102A and the SAG 104A to the SAG 104N in order to establish the communication link between the SAT 102A and the SAG 104N.

In some cases, the handover request 318 can include information about the SAG 104N for the new communication link, such as an SAG identifier, SAG routing information, etc.; a time and/or time slot for the handoff; information about the handoff; a bit, flag, or indication of the handover; etc. In response to the handover request 318, the UMAC sub-layer 310 can send a handover response 320 to the CM 314. The handover response 320 can indicate that the SAT 102A is ready for the handoff. In some cases, the UMAC sub-layer 310 can send the handover response 320 after the handover request 318 and before performing and/or completing the handoff. In other cases, the UMAC sub-layer 310 can send the handover response 320 (and/or another handover response) after the handover request 318 and after performing and/or completing the handoff.

Prior to the handoff, the UMAC sub-layer 310 can send a L2 Tx/Rx down command 322 to the lower MAC (LMAC) sub-layer 308 to initiate an L2 Tx/Rx takedown process to bring down the Tx and Rx connections at L2 layer 306 (e.g., at the MAC sublayer) for the previous SAG (e.g., SAG 104A), and a L1 Tx/Rx down command 324 to the L1 layer 302 to initiate a takedown process to bring down Tx and Rx interfaces at the L1 layer 302 to stop transmitting packets to SAG 104A. In some examples, the UMAC sub-layer 310 can send a single L2 Tx/Rx down command/message with instructions to bring down the L2 Tx and Rx connections. In other examples, the UMAC sub-layer 310 can send separate L2 Tx and L2 Rx down commands/messages with instructions to bring down the L2 Tx and Rx connections.

The CM 314 can also send a BPS Tx/Rx down command 326 to BPS 304, to stop beam pointing for SAG 104A communications. At this point, the connection between SAT 102A and SAG 104A can be terminated. In some examples, the BPS Tx/Rx down command 326 can include new beam pointing information, such as a new beam pointing direction/angle, a time associated with the new pointing direction/angle (and/or the new beam pointing operations), etc. In some cases, the CM 314 can send a single command/message to the BPS 304 with instructions to stop beam pointing operations. In other cases, the CM 314 can send separate Tx and Rx commands/messages to the BPS 304 with instructions to stop the beam pointing operations.

After the various Rx, Tx, and BPS takedown operations, the LMAC sub-layer 308 and the UMAC sub-layer 310 can perform a L2 Rx/Tx up process 332 to bring up Rx and Tx at the L2 layer 306 for communications with the new SAG (e.g., SAG 104N). The UMAC sub-layer 310 and the L1 layer 302 can also perform a L1 Tx/Rx up process 334 to bring up the Tx and Rx interfaces at the physical layer (e.g., L1 layer 302) for communications with the new SAG. The CM 314 can send a BPS Tx/Rx up command 336 to the BPS 304 to enable beam pointing for communications to the new SAG, and the L3 layer 312 can establish 340 the new communication link to the SAG 104N. In some cases, the UMAC sub-layer 310 can optionally generate a message for the CM 314 indicating that the SAT 102A has completed the handover and established the new communication link to the SAG 104N, and is ready to communicate with SAG 104N via the new communication link. Alternatively, in some cases, if any errors or failures occurred that may prevent the handoff from successfully occurring, the UMAC sub-layer 310 can optionally generate a message indicating that an error(s) or failure(s) has occurred.

Figure 3B:
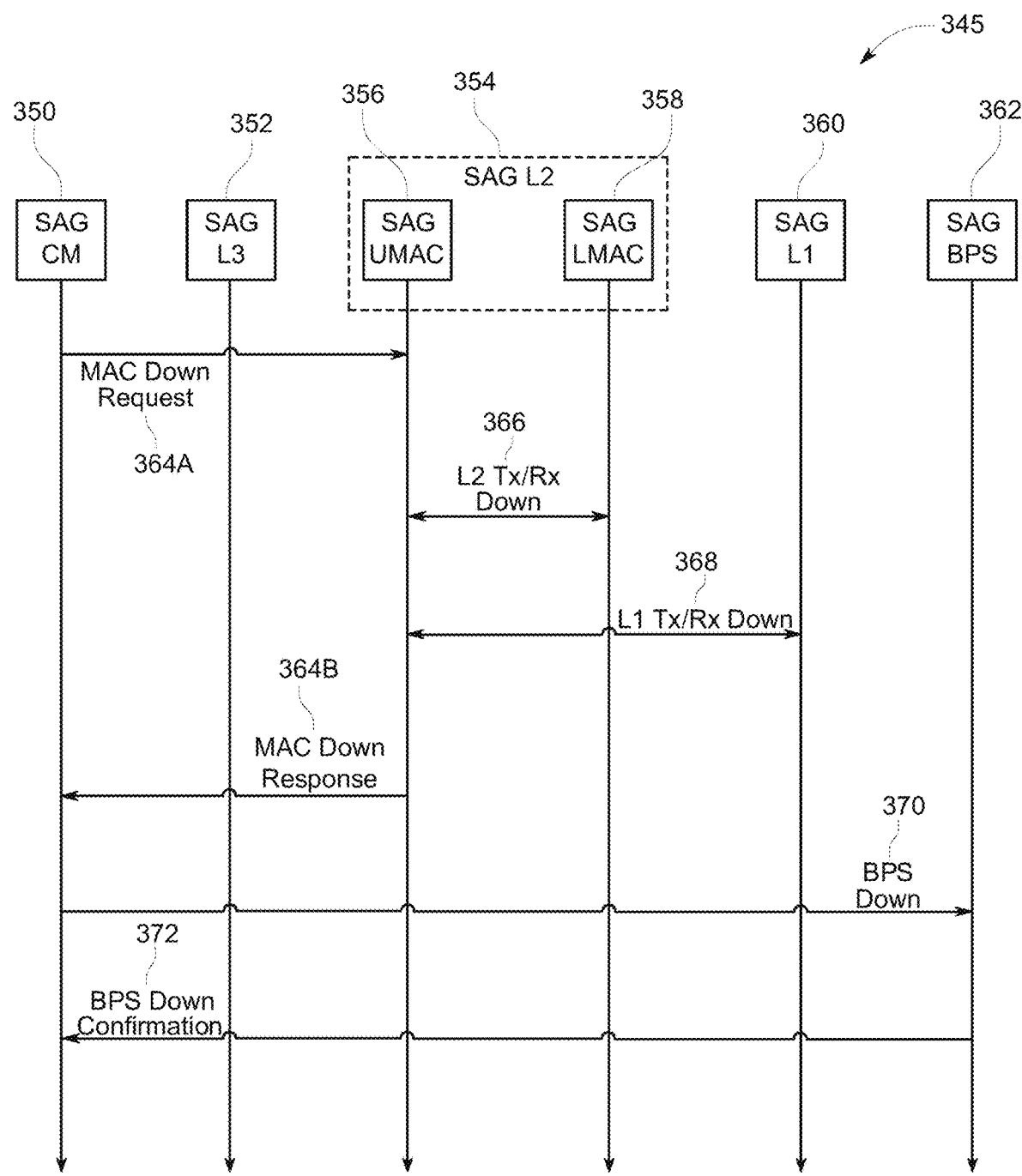
FIGS. 3B and 3C are diagrams illustrating example gateway message flow for a schedule-driven handover, in accordance with some examples of the present disclosure.

During the SAT message flow 300 for the handover, the SAGs 104A and 104N can also perform respective SAG message flows for performing the handover. FIG. 3B illustrates an example SAG message flow 345 performed by the SAG 104A for the handover described in the message flow 200 shown in FIG. 2.

In the example message flow 345, prior to the handover, the CM 350 can send a MAC down request 364A to the UMAC sub-layer 356 of L2 layer 354 (e.g., the MAC sub-layer). The MAC down request 364A can trigger the MAC sub-layer to bring down Tx/Rx connections/interfaces at the MAC sub-layer and the L1 layer and stop transmitting and receiving packets to and from the SAT 102A. In some examples, the MAC down request can include a corresponding time and/or time interval for the handover and/or communications with the SAT 102A, information about the SAT 102A (e.g., an identifier, routing/address information, etc.), information about Tx and/or Rx communications between the SAG 104A and the SAT 102A, etc. In some cases, the UMAC sub-layer 356 can reply with a MAC down response 364B indicating that the SAG 104A is ready for the MAC down operations.

Based on the MAC down request 364A, the UMAC sub-layer 356 can send a L2 Tx/Rx down command 366 (or separate L2 Tx and Rx commands) to the LMAC sub-layer 358 to initiate a Tx and Rx takedown process to bring down, at the MAC sublayer, Tx and Rx connections/communications associated with the SAT 102A. The UMAC sub-layer 356 can also send a L1 Tx/Rx down command 368 (or separate L1 Tx and Rx commands) to the L1 layer 360 to initiate a L1 Tx takedown process to bring down L1 Tx/Rx interfaces to stop transmitting packets to the SAT 102A.

After the Tx/Rx takedown process and the L1 Tx/Rx takedown process, communications from the SAG 104A to the SAT 102A are terminated. In some cases, the MAC sublayer of L2 (354) can clear the MAC buffer to discard any packets associated with the SAT 102A.

In some cases, the UMAC sub-layer 356 can issue the MAC down response 364B to inform the CM 350 the results of the MAC down process triggered by the MAC down request 364A. Moreover, the CM 350 can send a BPS down request 370 to the BPS 362 to stop beam pointing for communications with the SAT 102A. The BPS 362 can then send a BPS down confirmation 372 to the CM 350. The BPS down confirmation 372 can indicate that the BPS 362 has stopped beam pointing as requested.

Figure 3C:
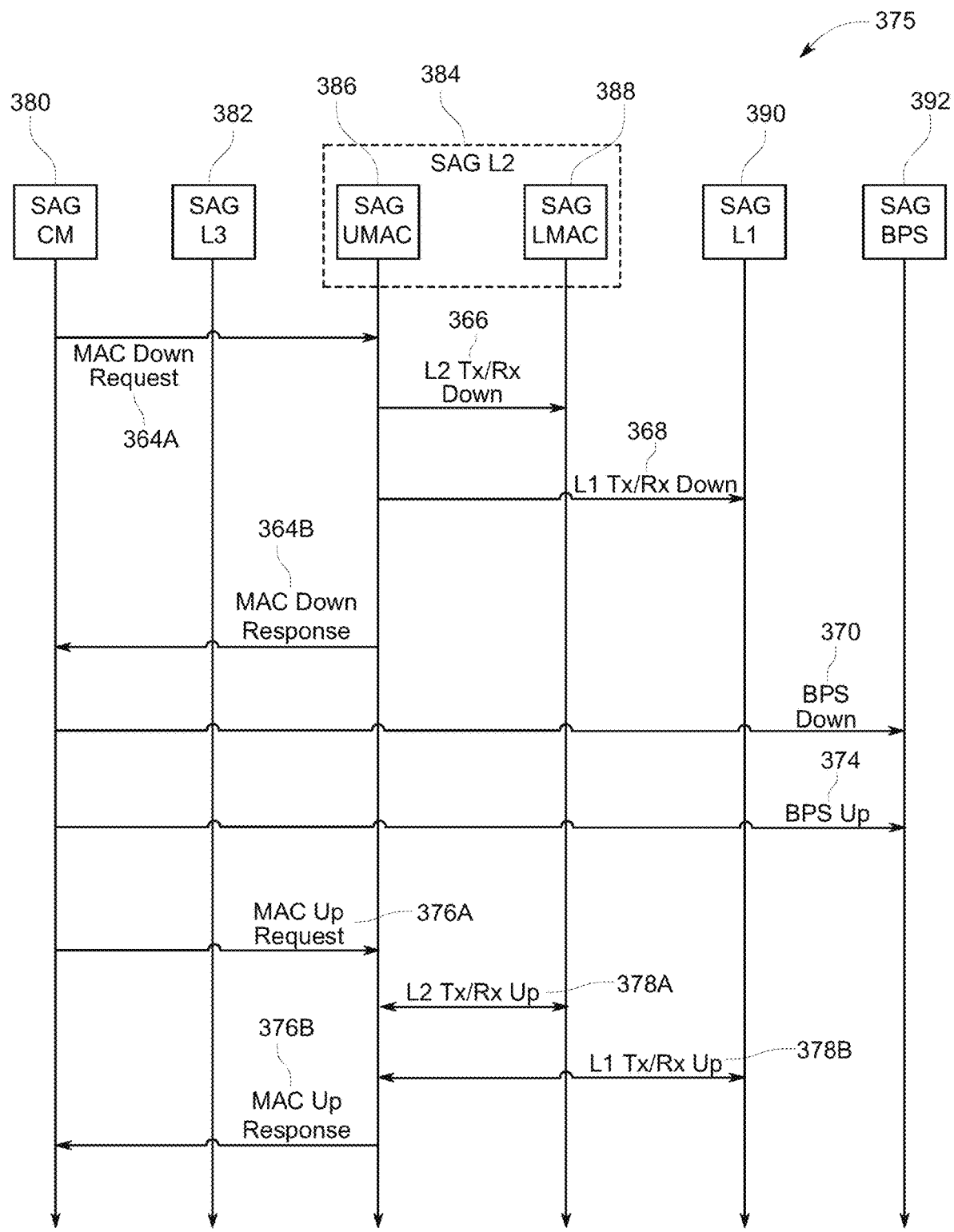

FIG. 3C illustrates an example SAG message flow 375 performed by the SAG 104N (the new SAG) for the handover described in the message flow 200 shown in FIG. 2. In the example message flow 375, prior to the handover, the CM 380 can send a MAC down request 364A to the UMAC layer 386 of L2 layer 384. The MAC down request 364A can trigger the MAC sub-layer to bring down Tx/Rx connections/interfaces at the MAC sub-layer and the L1 layer 390 and stop transmitting and receiving packets to and from current SAT in order to establish communications with the SAT 102A. In some examples, the MAC down request 364A can include a corresponding time and/or time interval for the handover and/or communications with the SAT 102A, information about the SAT 102A (e.g., an identifier, routing/address information, etc.), information about Tx and/or Rx communications between the SAG 104N and the SAT 102A, etc.

In some cases, the UMAC sub-layer 386 can optionally reply to the CM 380 with a MAC down response (e.g., MAC down response 364B) indicating that the SAG 104N is ready for the MAC down operations. In some cases, the UMAC sub-layer 386 can provide a MAC down response before the MAC down operations are completed. In other cases, the UMAC sub-layer 386 can provide a MAC down response before and/or after the MAC down operations are completed. Based on the MAC down request 364A, the UMAC layer 386 can send a L2 Tx/Rx down command 366 (or separate L2 Tx and Rx commands) to the LMAC sub-layer 388 to initiate a Tx/Rx takedown process to bring down, at the MAC sublayer, Tx and Rx connections/communications associated with a previous/current SAT. The UMAC layer 386 can also send a L1 Tx/Rx down command 368 (or separate L1 Tx and Rx down commands) to the L1 layer 390 to initiate a L1 Tx takedown process to bring down L1 Tx/Rx interfaces to stop transmitting packets to the previous/current SAT.

After the L2 and L1 Tx/Rx takedown process, communications from the SAG 104N to the previous SAT are terminated. In some examples, the UMAC layer 386 can clear a MAC buffer storing packets associated with such communications with the previous/current SAT.

In some cases, the UMAC layer 386 can issue a MAC down response 364B to inform the CM 380 the results of the MAC down process triggered by the MAC down request 364A. Moreover, the CM 380 can send a BPS down request 370 to the BPS 392 to stop beam pointing for communications with the previous SAT, and receive a BPS down confirmation from the BPS 392. The CM 380 can then send a BPS up request 374 to the BPS 392 to start beam pointing for communications with the new SAT, and receive a BPS down confirmation from the BPS 392 indicating that the BPS 392 has started beam pointing as requested. In some cases, the BPS down request 370 or the BPS up request 374 can include beam pointing information (e.g., time, direction, angle, etc.) for the communications with the new SAT.

The CM 380 can issue a MAC up request 376A to the UMAC layer 386 to trigger the UMAC layer 386 to enable Tx/Rx connections/interfaces at the MAC sublayer and L1 for communications with the SAT 102A. In some cases, the MAC up request 376A can include information about the new SAT (SAT 102A), such as an identifier, routing/address information, beam information, etc.; timing information such as a time and/or time interval for communications with the SAT 102A and/or the handover; etc. In some cases, the UMAC layer 386 can optionally send a MAC down response (e.g., MAC down response 364B) indicating that the SAG 104N is ready for the MAC down operations. In some cases, the UMAC sub-layer 386 can provide a MAC down response before the MAC down operations are completed. In other cases, the UMAC sub-layer 386 can provide a MAC down response before and/or after the MAC down operations are completed.

The UMAC layer 386 can receive the MAC up request 376A and perform a L2 Tx/Rx up process 378A with the LMAC sublayer 388, to enable Tx/Rx communications at the MAC sublayer. In some cases, the UMAC layer 386 can buffer packets associated with SAT 102A prior to the handover and/or after the handover is complete. Moreover, the UMAC layer 386 and the L1 layer 390 can perform a L1 Tx/Rx up process 378B to enable an L1 Tx/Rx interface for communicating with SAT 102A. In some cases, the UMAC layer 386 can issue a MAC up response 376B to inform the CM 380 the results of the MAC up process triggered by the MAC up request 376A.

For explanation purposes and simplicity, down/takedown commands/actions/operations (e.g., Tx down/takedown, Rx down/takedown, Tx/Rx down/takedown, BPS down/takedown, MAC down/takedown, etc.) are described throughout as bringing down, disabling, and/or stopping an associated connection, interface, state, service, action, etc. However, one of skill in the art will recognize that, in some examples, the down/takedown commands/actions/operations described herein can involve reconfiguring or modifying an associated connection, interface, state, service, action, etc., with or without bringing down, disabling, and/or stopping the associated connection, interface, state, service, action, etc.

Figure 4:
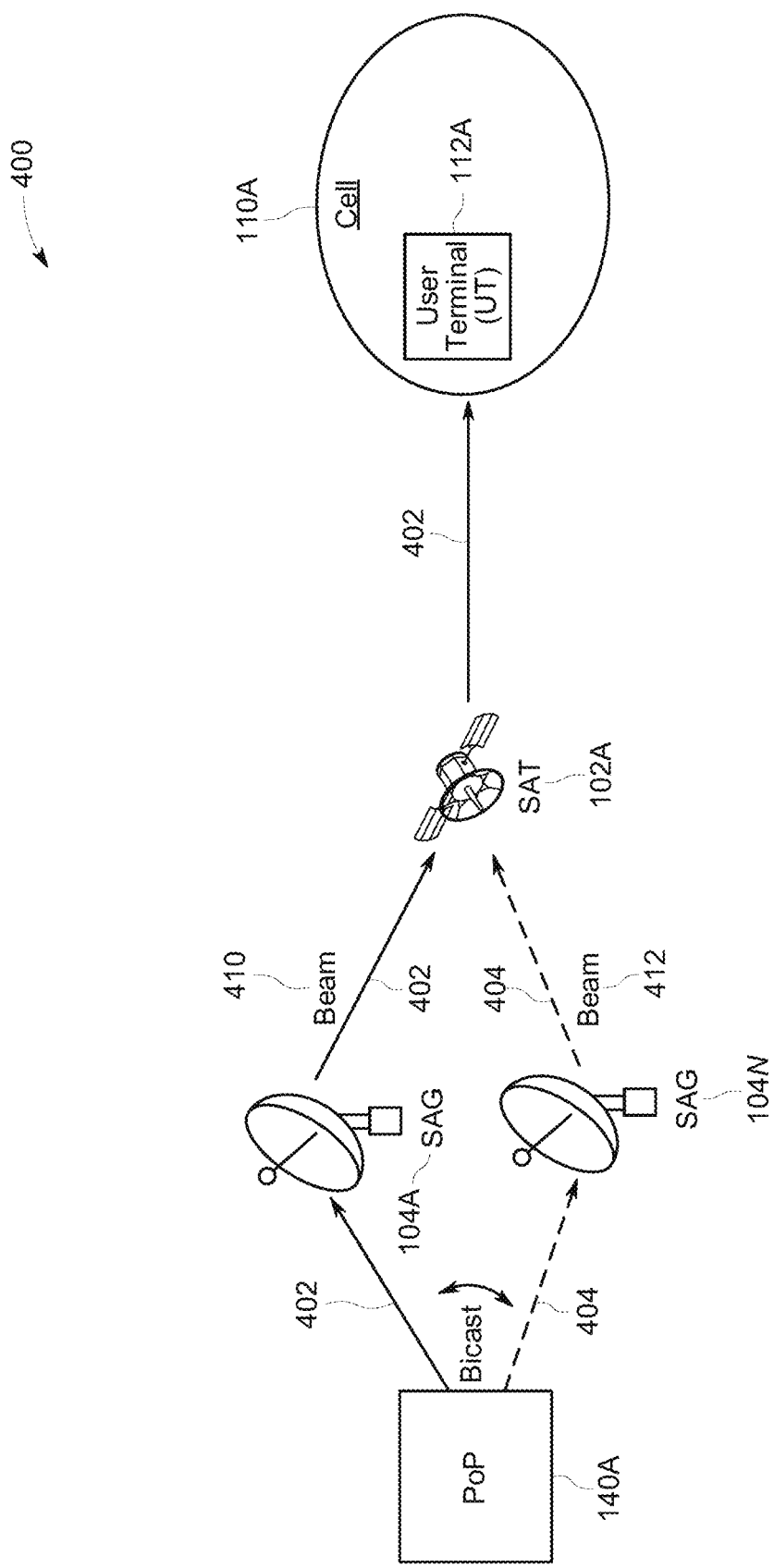
FIG. 4 is a diagram illustrating an example satellite handover where a satellite's connection with a gateway is transferred to a different gateway from an uplink direction, in accordance with some examples of the present disclosure.

FIG. 4 is a diagram illustrating an example SAT uplink handover 400 where a satellite's connection with a gateway is transferred to a different gateway from an uplink direction. In this example, SAT 102A currently connects to SAG 104A and serves the cell 110A and UT 112A in the cell 110A. The handover 400 has been triggered to transfer a connection between SAT 102A and SAG 104A to SAG 104N. In some examples, the handover 400 can be triggered based on a new schedule (e.g., 210) received and/or fetched from a route distribution service (e.g., 125).

Here, a current communication path (e.g., virtual communication link 170) for the UT 112A and the SAT 102A includes path 402, which includes a communication link between PoP site 140A and SAG 104A, and communication link between SAG 104A and SAT 102A, and a communication link between SAT 102A and UT 112A. Packets between the SAG 104A and the SAT 102A can be communicated along path 402 via beam 410. The SAT 102A, SAG 104A and SAG 104N can perform a handover where a communication link/beam between the SAT 102A and SAG 104A is transferred from the SAG 104A to the SAG 104N. Through the handover 400, a new path 404 (e.g., virtual communication link 170) can be established, including a communication link between PoP site 140A and SAG 104N, a communication link between SAG 104N and SAT 102A, and a communication link between SAT 102A and UT 112A. Packets between the SAT 102A and the SAG 104N can be communicated via beam 412.

To prevent packet loss before, during, and/or after the handover, packets transmitted by PoP site 140A to SAG 104A and SAG 104N for routing to SAT 102A can be bicasted over the path 402 and beam 410 and the new path 404 and beam 412. In some cases, before the handover, packets can be sent to the SAG 104N and SAT 102A over the new path 404 and beam 412 when the same packets transmitted over the path 402 and beam 410 are estimated to still reach the SAG 104N and SAT 102A, within a certain threshold of confidence. Moreover, in some cases, packets may no longer be sent to SAG 104N and SAT 102A over the path 402 and beam 410 when it is determined within a certain threshold of confidence that such packets will not reach the SAT 102A and/or the SAG 104N.

In some cases, SAG 104N can be pointing to the SAT 102A in advance (e.g., prior to the handover 400) so the SAG 104N is available and/or ready for the handover 400 in advance. In some examples, the SAG 104N can be idle and pointing to the SAT 102A in advance to reduce latencies during handover. In some cases, SAG 104N can be a specific gateway selected to point to the SAT 102A in advance and/or one of a group of gateways that are idle (e.g., intentionally/selectively or based on current conditions) and can be pointed to the SAT 102A in advance. In some examples, the SAG 104N can be prepared and/or pointed to SAT 102A in advance based on a schedule (e.g., 210) for satellite-based communications in the satellite-based environment.

In some cases, the SAG 104N can buffer any packets on the new path 404 and/or the beam 412 (and/or destined to or associated with the SAT 102A), and can discard such packets after the handover is complete. In some cases, the SAG 104A can similarly buffer any packets associated with SAT 102A and discard such packets after the handover. For example, after the handover 400, the SAG 104A can discard any packets that are destined to, and/or associated with, the SAT 102A.

In some examples, bicasted packets can include an indication that such packets should not be discarded during the handover. For example, the bicasted packets can include a bit flip, flag, parameter, etc., identifying the handover and/or indicating that the packets should not be discarded until the handover has successfully completed, to ensure against complete packet loss during the handover process. In some cases, the MAC sub-layer of the SAG 104A and/or SAG 104N can check 1-bit flipping in the header and buffer any packets targeting SAT 102A after the handover, and prevent such packets from being discarded before and/or during the handover. After the MAC sub-layer at the SAG 104A and/or the SAG 104N has performed a L1 and L2 Tx/Rx takedown, the MAC sub-layer can discard any packets on the beam 410 and/or 412 and/or destined to the SAT 102A.

In some cases, the UT 112A may receive duplicate packets from the bicasting. Accordingly, the UT 112A can perform a check for duplicate packets and deduplicate any duplicate packets it received from the SAT 102A. In some examples, the UT 112A can compare one or more bits (e.g., a bit in the header), flags, parameters, and/or header information in packets to determine if the packets are duplicate packets. The UT 112A can discard any duplicate packets and retain a single copy of each duplicate packet. In other examples, the UT 112A can deduplicate packets by comparing a hash or signature of one or more portions of the packets, and determine that packets are duplicates if the comparison yields a match. In other examples, the UT 112A can use any other deduplication strategy to identify duplicate packets.

Figure 5:
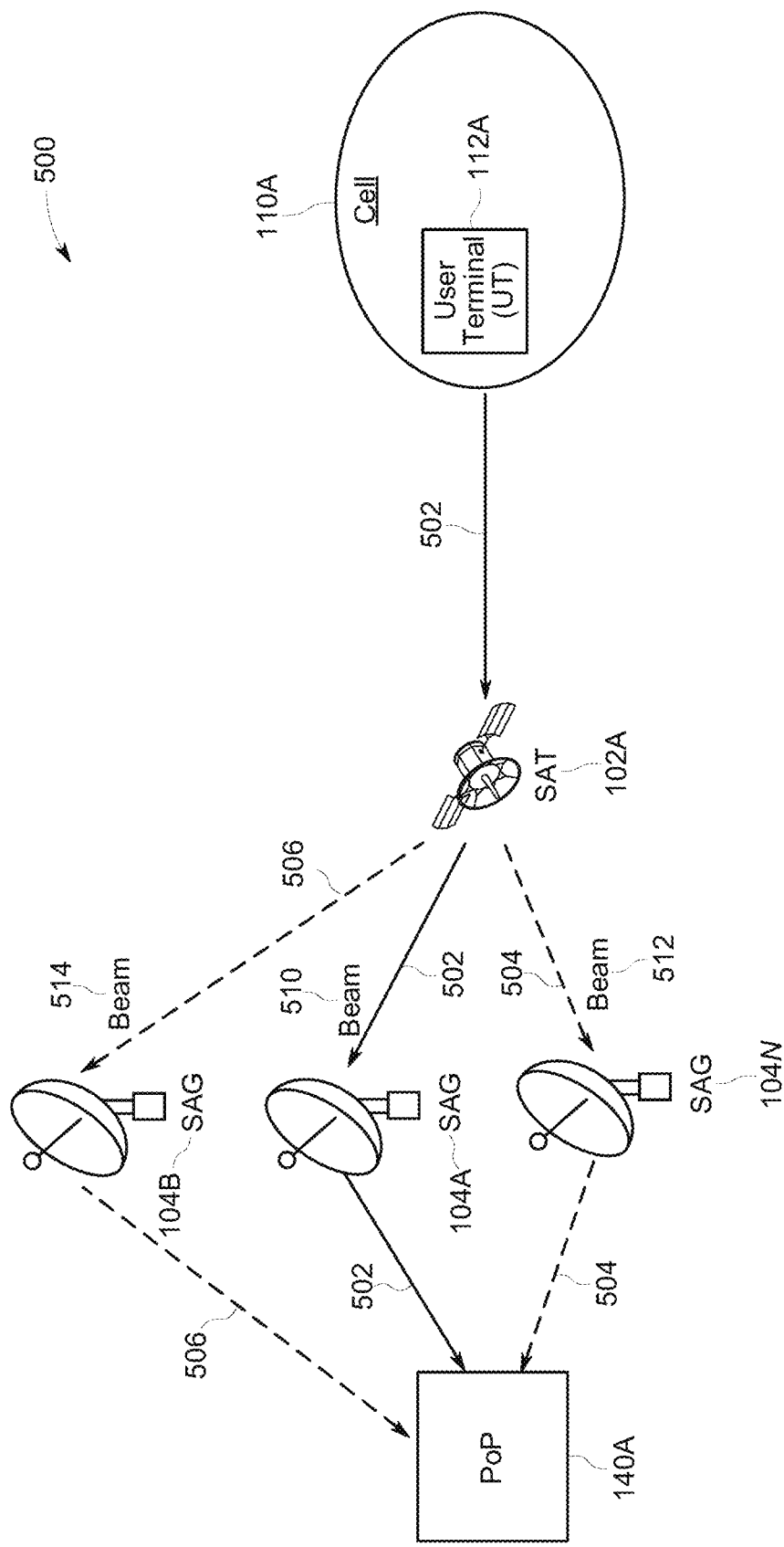
FIG. 5 is a diagram illustrating an example satellite handover where a satellite's connection with a gateway is transferred to a different gateway from a downlink direction, in accordance with some examples of the present disclosure.

FIG. 5 is a diagram illustrating an example SAT downlink handover 500 where a satellite's connection with a gateway is transferred to a different gateway from a downlink direction. In this example, SAT 102A currently connects to SAG 104A and serves the cell 110A and UT 112A in the cell 110A. In some examples, SAT 102A can connect to multiple SAGs. For example, in some cases, SAT 102A can also connect to SAG 104B. The handover 500 has been triggered to transfer a connection between SAT 102A and SAG 104A to SAG 104N. In some examples, the handover 500 can be triggered based on a new schedule (e.g., 210) received and/or fetched from a route distribution service (e.g., 125).

A current communication path (e.g., virtual communication link 170) for the UT 112A and the SAT 102A includes path 502, which includes a communication link between PoP site 140A and SAG 104A, and communication link between SAG 104A and SAT 102A, and a communication link between SAT 102A and UT 112A. Packets between the SAG 104A and SAT 102A can be communicated along path 502 via beam 510. In some examples, another communication path (e.g., virtual communication link 170) between the SAT 102A and the PoP site 140A can include path 506, which includes a communication link between PoP site 140A and SAG 104B, and a communication link between SAG 104B and SAT 102A. Packets between the SAG 104A and the SAT 102A can be communicated along path 502 via beam 514.

The SAT 102A, SAG 104A and SAG 104N can perform a handover where a communication link/beam between the SAT 102A and SAG 104A is transferred from the SAG 104A to the SAG 104N. Through the handover 500, a new path 504 (e.g., virtual communication link 170) can be established, including a communication link between PoP site 140A and SAG 104N, a communication link between SAG 104N and SAT 102A, and a communication link between SAT 102A and UT 112A. Packets from the SAT 102A to SAG 104N can be communicated via the new path 504.

To prevent packet loss before, during, and/or after the handover, packets transmitted over the beam 510 and the beam 512 can be bicasted, to ensure a copy of the packet reaches SAG 104A and/or SAG 104N. For example, packets over the beams 510 and 512 with PoP site 140A as the destination can be bicasted to SAG 104A and SAG 104N. PoP site 140A can sort packets it receives and deduplicate any duplicate packets as previously described.

In some examples, the SAT 102A can enable the old and new routing tables at L3 before the handover is complete to allow the bicasting of packets on the beams 510 and 512. In some cases, before the handover from the beam 510 to the beam 512, the SAT 102A, SAG 104A, and/or SAG 104N can buffer any packets associated with the handover, and can discard packets on the beam 510 after the handover is complete. Moreover, the SAT 102A can use a bit, flag, parameter, etc., to indicate that the packets are associated with a handover and/or indicate that the packets should not be discarded during the handover.

In some cases, prior to the handover, a slewing slot (e.g., a slewing time and/or time interval) can be defined for slewing the SAG 104N. The SAG 104N can be slewed during the slewing slot to connect to the SAT 102A. In some examples, the SAG 104N can be slewed by a slew angle, rotational vector, or angular components (e.g., yaw, pitch, roll). In some cases, the slew angle, rotational vector, or angular components can be based on one or more positions of the SAT 102A relative to the SAG 104N at one or more times or time intervals.

Figure 6:
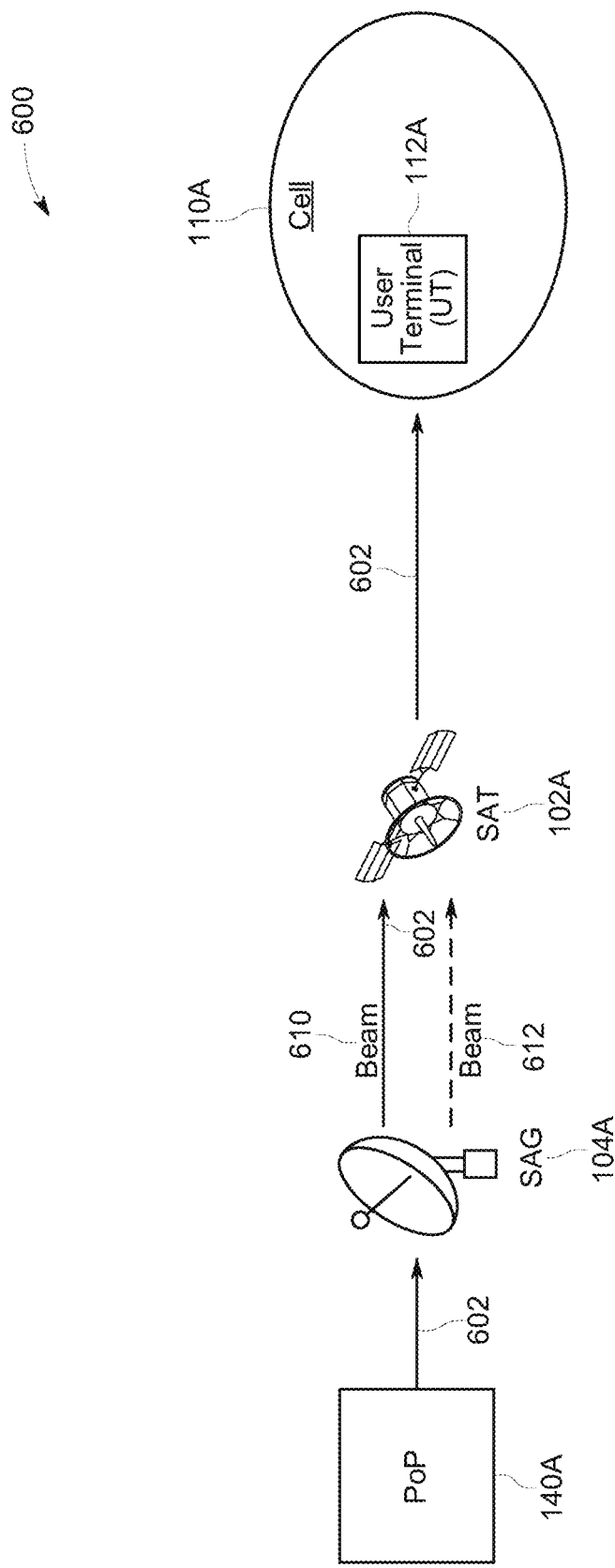
FIG. 6 is a diagram illustrating an example satellite handover where a satellite's connection with a gateway is transferred in the uplink direction from one beam of the gateway to a different beam of the gateway, in accordance with some examples of the present disclosure.

FIG. 6 is a diagram illustrating an example SAT uplink handover 600 where a satellite's connection with a gateway is transferred in the uplink direction from one beam/communication link of the gateway to a different beam/communication link of the gateway. In this example, SAT 102A connects to SAG 104A and serves the cell 110A and UT 112A in the cell 110A. Packets between PoP site 140A and UT 112A can be transmitted along path 602, and SAG 104A can communicate with SAT 102A through beam 610. The handover 600 has been triggered to transfer a connection between SAT 102A and SAG 104A from beam 610 to beam 612.

In some cases, the SAG 104A can perform the handover based on a schedule it fetches and/or receives as previously explained. Moreover, the SAG 104A can perform the handover with or without issuing a handover request. For example, in some cases, when the SAG 104A checks the destination satellite (e.g., via CM 350), if the SAG 104A determines that the destination satellite has not changed, the SAG 104A may not generate/process a handover request (e.g., from CM 350 to L3 layer 352 and/or UMAC sublayer 356). In some examples, the SAG 104A may switch beams to perform the handover without a handoff request and/or a full handoff procedure as described in FIG. 2, 3A, 3B, or 3C.

To prevent packet loss before, during, and/or after the handover, the SAG 104A can bicast packets over the beam 610 and the beam 612 to ensure a copy of the packet reaches SAT 102A. The SAT 102A can perform an Rx up procedure before the handover and/or before beam 610 is brought down to enable connectivity via beam 612 and ensure packets from SAG 104A can be received through at least one beam. For example, in some cases, the SAT UMAC sublayer 310 and the SAT LMAC sublayer 308 can perform an Rx up procedure for beam 612.

Because of the bicasting, the UT 112A may receive duplicate packets from SAT 102A. The UT 112A can thus check for duplicate packets and deduplicate any duplicates it identifies as previously explained.

Figure 7:
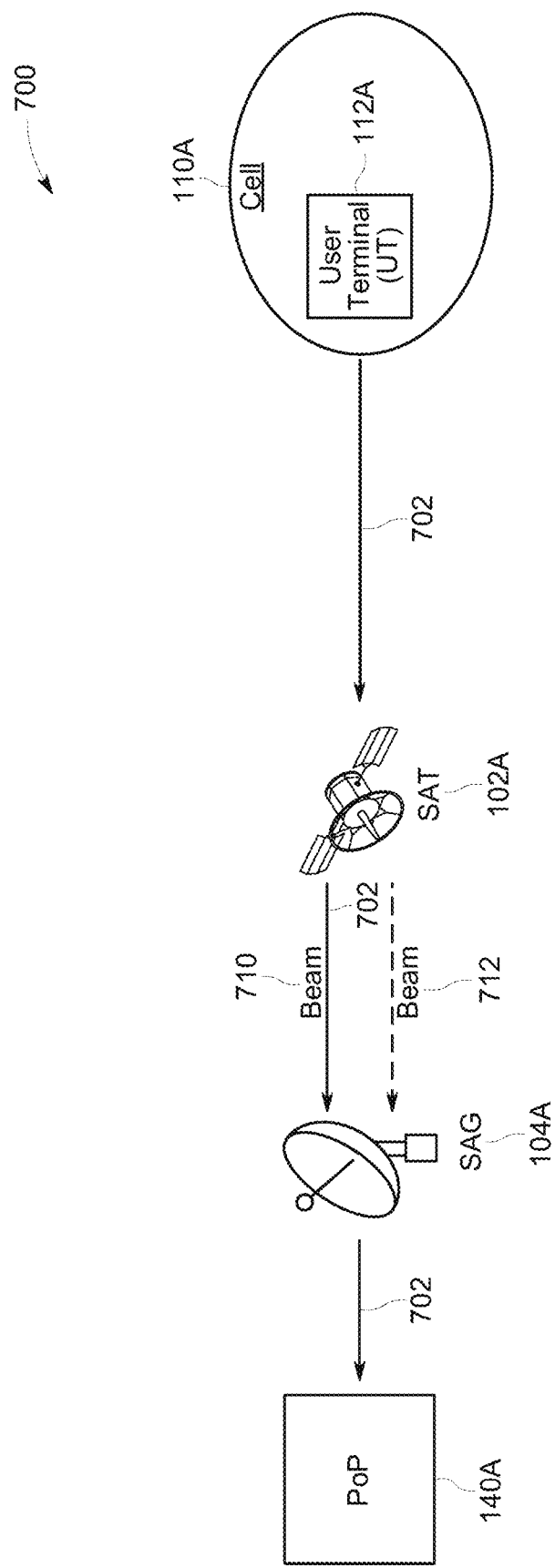
FIG. 7 is a diagram illustrating an example satellite handover where a satellite's connection with a gateway is transferred in the downlink direction from one beam/link of the satellite to a different beam/link of the satellite, in accordance with some examples of the present disclosure.

FIG. 7 is a diagram illustrating an example SAT downlink handover 700 where a satellite's connection with a gateway is transferred in the downlink direction from one beam/communication link of the satellite to a different beam/communication link of the satellite. In this example, SAT 102A connects to SAG 104A and serves the cell 110A and UT 112A in the cell 110A. Packets between PoP site 140A and UT 112A can be transmitted along path 702, and SAT 102 communicates with SAG 104A through beam 710. The handover 700 has been triggered to transfer a connection between SAT 102A and SAG 104A from beam 710 to beam 712.

In some cases, the SAT 102A can perform the handover based on a schedule it fetches and/or receives as previously explained. Moreover, in some cases, the SAG 104A may not generate/process a handover request (e.g., from CM 350 to L3 layer 352 and/or UMAC sublayer 356) if it checks the destination satellite (e.g., via CM 350) and determines that the destination satellite has not changed.

To prevent packet loss before, during, and/or after the handover, the SAT 102A can bicast packets over the beam 710 and the beam 712 to ensure a copy of the packet reaches SAG 104A. In some cases, the SAG 104A can perform an Rx up procedure before the handover and/or before beam 710 is brought down to enable connectivity via beam 712 and ensure packets from SAT 102A can be received through at least one beam. For example, in some cases, the SAT UMAC sublayer 356 and the SAT LMAC sublayer 358 can perform an Rx up procedure for beam 712. In some cases, the SAT 102A can enable old and new routing tables (e.g., at a L3 egress interface and/or network processor) before the handover time and/or completion to allow bicasting packets to the SAG 104A on beams 710 and 712 and avoid packet loss.

The PoP site 140A can perform packet sorting for packets it receives from SAG 104A. Because of the bicasting, the PoP site 140A may receive duplicate packets from SAT 102A. The PoP site 140A can thus check for duplicate packets and deduplicate any duplicates it identifies as previously explained.

In some examples, a satellite, user terminal, and/or gateway can do multiple handovers in a combined handover scenario. For example, a user terminal can perform a handover to switch from one satellite to a different satellite, and the different satellite can perform a handover to switch gateways or beams. In another example, a user terminal can perform a handover to switch between beams of a satellite, and the satellite can switch between gateways.

Figure 8:
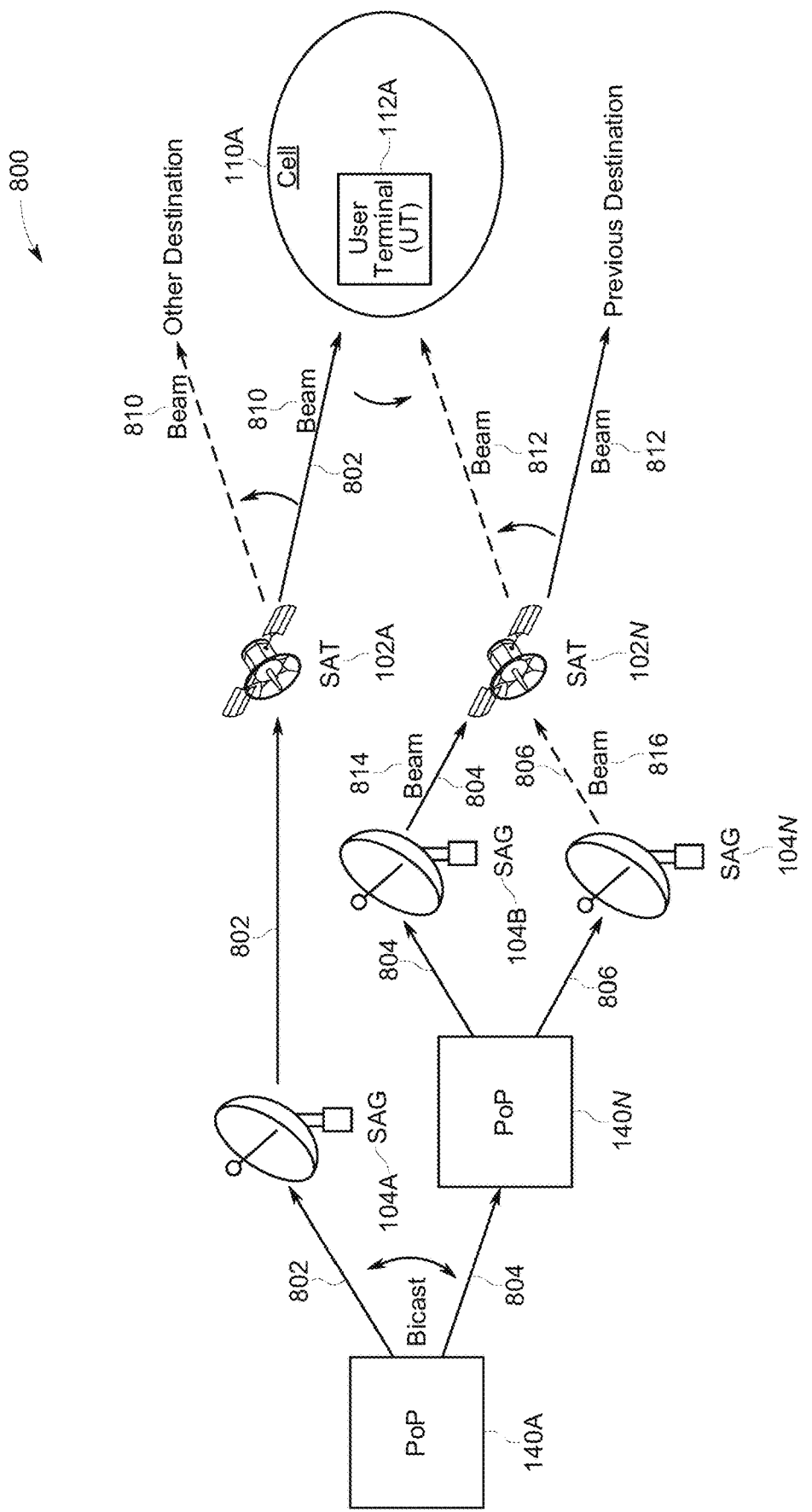
FIG. 8 is a diagram illustrating an example of a combined handover where a user terminal's connection to a satellite is transferred to a different satellite and the different satellite's connection to a gateway is transferred to a different gateway, in accordance with some examples of the present disclosure.

FIG. 8 is a diagram illustrating an example of a combined handover 800 where a user terminal's connection to a satellite is transferred to a different satellite and the different satellite's connection to a gateway is transferred to a different gateway. In this example, SAT 102A currently connects to SAG 104A and serves the cell 110A and UT 112A in the cell 110A. The handover 800 has been triggered to transfer a connection between UT 112A and beam 810 of SAT 102A to beam 812 of SAT 102N, and transfer a connection between SAT 102N and SAG 104B to SAG 104N. In some examples, the handover 800 can be triggered based on a new schedule (e.g., 210) received and/or fetched from a route distribution service (e.g., 125).

Here, a current communication path (e.g., virtual communication link 170) for the UT 112A and the SAT 102A includes path 802, which includes a communication link between PoP site 140A and SAG 104A, a communication link between SAG 104A and SAT 102A, and a communication link between SAT 102A and UT 112A. Packets between the SAT 102A and the UT 112A can be communicated along path 802 via beam 810. Moreover, a current communication path between PoP site 140A and SAT 102N includes path 804, which includes a communication link between PoP site 140A to PoP site 140N (e.g., home PoP site and intermediate PoP site), a communication link between PoP site 140N and SAG 104B, and a communication link between SAG 104B and SAT 102N. Packets between SAG 104B and SAT 102N can be communicated over beam 814.

Through the combined handover 800, a handover is performed where UT 112A switches from SAT 102A to SAT 102N, and specifically from beam 810 of SAT 102A to beam 812 of SAT 102N. Another handover is also performed where the new satellite that will serve UT 112A after the handover, SAT 102N, switches from beam 814 of SAG 104B to beam 816 of SAG 104N. After the combined handover 800, end-to-end communications between UT 112A and PoP site 140N can be transmitted along path 806 (e.g., virtual communication link 170) between PoP site 140N, SAG 104N, and SAT 102N, and via beam 812 of SAT 102N.

To prevent packet loss before, during, and/or after the handover 800, packets transmitted to the cell 110A and UT 112A can be bicasted over the paths 802 and 804. For example, PoP site 140A can bicast packets destined to UT 112A to SAG 104A and PoP site 140N. SAG 104A can forward the packets it receives from PoP site 140A to SAT 102A, which can transmit the packets to UT 112A via beam 810. PoP site 140N can forward the packets it receives from PoP site 140A to SAG 104B and/or SAG 104N, which can forward the packets to SAT 102N via beam 814 and/or 816, respectively. SAT 102N can transmit such packets to UT 112A via beam 812. UT 112A can check for any duplicate packets it may receive and perform a packet deduplication to discard any duplicates, as previously explained.

In some cases, before the handover 800 is complete, the SAG 104A, the SAG 104N, the SAT 102A and/or the SAT 102N can buffer any packets from PoP site 140A (and/or destined to or associated with the cell 110A and UT 112A), and can discard any buffered packets after the handover is complete. In some examples, the PoP site 140A, the SAT 102A, the PoP site 140N, and/or the SAT 102N can enable the old and new routing tables at L3 before the handover is complete to allow the bicasting of packets and/or routing of packets along old and new paths.

Figure 9:
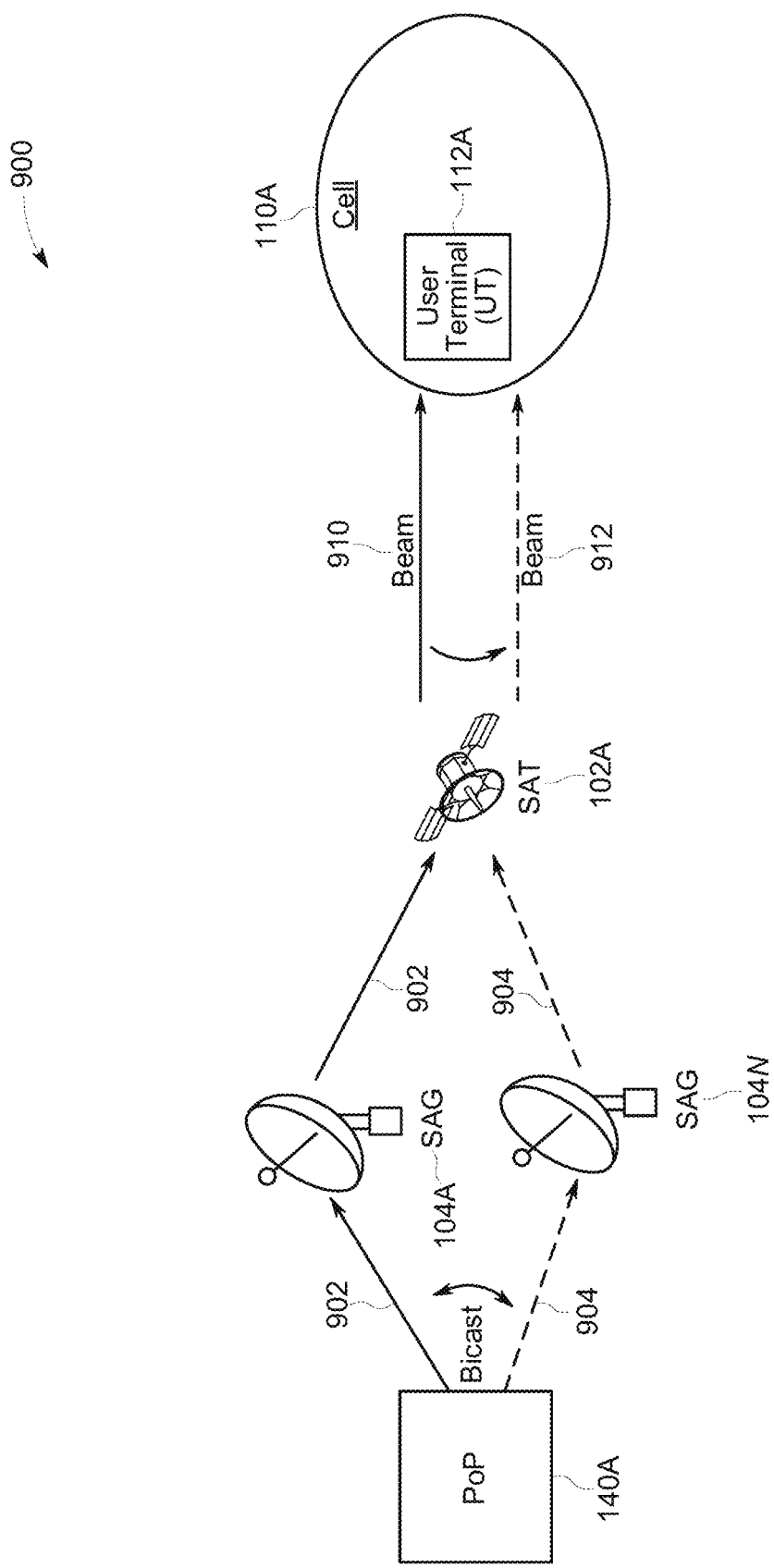
FIG. 9 is a diagram illustrating another example of a combined handover where a user terminal's connection to a satellite is transferred from one beam of the satellite to a different beam of the satellite and the satellite's connection to a gateway is transferred to a different gateway, in accordance with some examples of the present disclosure.

FIG. 9 is a diagram illustrating another example of a combined handover 900 where a user terminal's connection to a satellite is transferred from one beam of the satellite to a different beam of the satellite and the satellite's connection to a gateway is transferred to a different gateway. In this example, SAT 102A currently connects to SAG 104A and serves the cell 110A and UT 112A in the cell 110A via beam 910. The handover 900 has been triggered to transfer a connection between UT 112A and beam 910 of SAT 102A to beam 912 of SAT 102A, and transfer a connection between SAT 102A and SAG 104A to SAG 104N. In some examples, the handover 900 can be triggered based on a new schedule (e.g., 210) received, distributed and/or fetched from a route distribution service (e.g., 125).

Here, a current end-to-end communication path (e.g., virtual communication link 170) between the PoP site 140A and the UT 112A includes path 902 and beam 910. Path 902 includes a communication link between PoP site 140A and SAG 104A, and a communication link between SAG 104A and SAT 102A. Packets between the SAT 102A and UT 112A can be communicated via beam 910.

Through the combined handover 900, a handover is performed where UT 112A switches from beam 910 of SAT 102A to beam 912 of SAT 102A, and another handover is performed where SAT 102A switches from SAG 104A to SAG 104N. After the combined handover 900, end-to-end communications between UT 112A and PoP site 140A can be transmitted along path 904 (e.g., virtual communication link 170) between PoP site 140A, SAG 104N, and SAT 102A, and via beam 912 of SAT 102A.

To prevent packet loss before, during, and/or after the handover 900, packets transmitted to the cell 110A and UT 112A can be bicasted over the paths 902 and 904. For example, PoP site 140A can bicast packets destined to UT 112A to SAG 104A and SAG 104N. SAG 104A can forward to SAT 102A the packets it receives from PoP site 140A that are destined to UT 112A (and/or have a certain handover identifier or bit), and to SAT 102A can transmit the packets to UT 112A via beam 910. SAG 104N can forward to SAT 102A the packets it receives from PoP site that are destined to UT 112A (and/or have a certain handover identifier or bit), and SAT 102A can forward the packets to UT 112A via beam 912. UT 112A can check for any duplicate packets it may receive and perform a packet deduplication to discard any duplicates, as previously explained.

In some cases, before the handover 900 is complete, the SAT 102A can buffer any packets from having a handover identifier associated with the handover 900 (e.g., a handover bit, a flag, etc.) and/or destined to or associated with the cell 110A and UT 112A, and can discard any old packets buffered. Moreover, in some examples, a MAC sublayer at UT 112A can process a handover at the UT 112A to switch L1 and L2 connections/interfaces to attach to beam 912.

Having disclosed example systems, components and concepts, the disclosure now turns to the example methods 1000 and 1020 for performing low latency handovers, as shown in FIGS. 10A and 10B. The steps outlined herein are non-limiting examples provided for illustration purposes, and can be implemented in any combination thereof, including combinations that exclude, add, or modify certain steps.

At block 1002, the method 1000 can include receiving, by a satellite (e.g., SAT 102A), a schedule (e.g., 210) of communications between the satellite and one or more gateways (e.g., SAG 104A, . . . , SAG 104N). In some examples, the schedule can be provided prior to (e.g., in advance), or in anticipation of, one or more handovers of links/communications between devices.

In some cases, the schedule can define what entities should communicate with what other entities, when certain entities should communicate with certain other entities, etc. For example, the schedule can indicate that the satellite should communicate with a different gateway than a current gateway, and can define one or more time slots and/or radio frames in which the satellite should communicate with the different gateway and/or perform a handover to transfer a communication link from the current gateway to the different gateway. In some cases, the schedule can indicate which satellite, gateway, user terminal, and/or PoP site should be included in, or part of, an end-to-end communication link and/or communication session between the satellite, gateway, user terminal, and/or PoP site. In some cases, the schedule can also indicate one or more time slots for the satellite, gateway, user terminal, and/or PoP site to communicate in.

At block 1004, the method 1000 can include requesting, based on the schedule, a handover (e.g., handover(s) 400, 500, 600, 700, 800, 900) from a communication link (e.g., a beam) between the satellite and a gateway (e.g., SAG 104A) to a different communication link between the satellite and one of the gateway or a different gateway (e.g., SAG 104B or 104N). In some examples, the communication link between the satellite and the gateway can include the gateway and a first PoP site (e.g., 140A), and the different communication link between the satellite and one of the gateway or the different gateway can include the different gateway and the first PoP site and/or a second PoP site (e.g., 140N).

At block 1006, the method 1000 can include processing, prior to a completion of the handover, packets bicasted over the communication link between the satellite and the gateway and the different communication link between the satellite and one of the gateway or the different gateway.

In some examples, processing the packets bicasted over the communication link and the different communication link can include transmitting duplicate packets over the communication link between the satellite and the gateway and the different communication link between the satellite and one of the gateway or the different gateway. For example, the satellite can transmit duplicate packets destined to the gateway via the communication link and destined to the gateway or the different gateway via the different communication link.

In some examples, processing the packets bicasted over the communication link and the different communication link can include receiving duplicate packets through the communication link between the satellite and the gateway and the different communication link between the satellite and one of the gateway or the different gateway. For example, the satellite can receive duplicate packets bicasted over the communication link and the different communication link. In some cases, the duplicate packets can be bicasted by a PoP site (e.g., 140A), the gateway, or the different gateway.

At block 1008, the method 1000 can include performing the handover from the communication link between the satellite and the gateway to the different communication link between the satellite and the one of the gateway or the different gateway. In some cases, performing the handover can include disabling, at a layer 2 (L2) and layer 1 (L1) of the satellite, one or more receive (Rx) and transmit (Tx) interfaces associated with the communication link between the satellite and the gateway. For example, the satellite can disable (or change), at the physical layer (e.g., 302) and a MAC sublayer (e.g., 308, 310) of L2 (e.g., 306), Rx and Tx interfaces (e.g., via L1 and L2 Rx/Tx takedown procedures) associated with the communication link between the satellite and the gateway to terminate the communication link between the satellite and the gateway.

In some cases, performing the handover can include configuring, at the L1 and L2 of the satellite, Rx and Tx communications associated with the different communication link between the satellite and one of the gateway or the different gateway, and establishing the different communication link between the satellite and one of the gateway or the different gateway. For example, the satellite can perform L1 and L2 Rx/Tx up procedures to enable Rx/Tx interfaces for the different communication link in order to establish the different communication link and enable communications through the different communication link.

In some cases, performing the handover can also include disabling or changing, at the satellite, beam pointing (e.g., via a BPS Tx/Rx down command 326) associated with the communication link between the satellite and the gateway, and enabling beam pointing (e.g., via a BPS Tx/Rx up command 336) associated with the different communication link between the satellite and one of the gateway or the different gateway.

At block 1010, the method 1000 can include transmitting, by the satellite after the handover, one or more packets via the different communication link between the satellite and one of the gateway or the different gateway. In some cases, the method 1000 can also include receiving, by the satellite after the handover, one or more packets via the different communication link.

In some aspects, the method 1000 can include performing an additional handover of connectivity between the satellite and a user terminal. In some cases, the additional handover can include a transfer of the connectivity from a beam of the satellite to a different beam of the satellite. Moreover, the additional handover (or a portion of the additional handover) and the handover (or a portion of the handover) from the communication link to the different communication link can be performed during a same time period. For example, the satellite can performed a combined handover (e.g., 800, 900) at the same time or during one or more overlapping periods of time.

In some aspects, the method 1000 can include performing an additional handover from a previous communication link between a user terminal (e.g., 112A) and a previous satellite to a new communication link between the user terminal and the satellite. For example, the method 1000 can include performing a combined handover 800 as described with respect to FIG. 8. In some cases, the combined handover can be performed at a same time or during one or more overlapping periods of time.

FIG. 10B is a flowchart illustrating another example method 1020 for performing low latency handovers. At block 1022, the method 1020 can include receiving, by a gateway (e.g., SAG 104A), a schedule (e.g., 210) of communications between the gateway and one or more satellites (e.g., SAT 102A, . . . , SAT 102N). In some examples, the schedule can be provided prior to (e.g., in advance), or in anticipation of, one or more handovers of links/communications between devices.

In some cases, the schedule can define what entities should communicate with what other entities, when certain entities should communicate with certain other entities, etc. For example, the schedule can indicate that the gateway should communicate with a different satellite than a current satellite, and can define one or more time slots and/or radio frames in which the gateway should communicate with the different satellite and/or perform a handover to transfer a communication link from the current satellite to the different satellite. In some cases, the schedule can indicate which satellite, gateway, user terminal, and/or PoP site should be included in, or part of, an end-to-end communication link and/or communication session between the satellite, gateway, user terminal, and/or PoP site. In some cases, the schedule can also indicate one or more time slots for the satellite, gateway, user terminal, and/or PoP site to communicate in.

At block 1024, the method 1020 can include requesting, based on the schedule, a handover (e.g., handover(s) 400, 500, 600, 700, 800, 900) from a communication link (e.g., a beam) between the gateway and a satellite (e.g., SAT 102A) to a different communication link between the gateway and one of the satellite or a different satellite (e.g., SAT 102B or 102N). In some examples, the communication link between the gateway and the satellite can include the satellite and a first PoP site (e.g., 140A), and the different communication link between the gateway and one of the satellite or the different satellite can include the different satellite and the first PoP site and/or a second PoP site (e.g., 140N).

At block 1026, the method 1020 can include processing, prior to a completion of the handover, packets bicasted over the communication link between the gateway and the satellite and the different communication link between the gateway and one of the satellite or the different satellite.

In some examples, processing the packets bicasted over the communication link and the different communication link can include transmitting a copy of a set of duplicate packets over each of the communication link between the gateway and the satellite and the different communication link between the gateway and one of the satellite or the different satellite. For example, the gateway can transmit one duplicate packet copy via the communication link and another duplicate packet copy via the different communication link.

In some examples, processing the packets bicasted over the communication link and the different communication link can include receiving duplicate packets through the communication link between the gateway and the satellite and the different communication link between the gateway and one of the satellite or the different satellite. For example, the gateway can receive duplicate packets bicasted over the communication link and the different communication link.

In some cases, the duplicate packets can be bicasted by a PoP site (e.g., 140A), the satellite, or the different satellite.

At block 1028, the method 1020 can include performing the handover from the communication link between the gateway and the satellite to the different communication link between the gateway and the one of the satellite or the different satellite. In some cases, performing the handover can include disabling, at a layer 2 (L2) and layer 1 (L1) of the gateway, one or more receive (Rx) and transmit (Tx) interfaces associated with the communication link between the gateway and the satellite. For example, the gateway can disable (or change), at the physical layer (e.g., 302) and a MAC sublayer (e.g., 308, 310) of L2 (e.g., 306), Rx and Tx interfaces (e.g., via L1 and L2 Rx/Tx takedown procedures) associated with the communication link between the gateway and the satellite to terminate the communication link between the gateway and the satellite.

In some cases, performing the handover can include configuring, at the L1 and L2 of the gateway, Rx and Tx communications associated with the different communication link between the gateway and one of the satellite or the different satellite, and establishing the different communication link between the gateway and one of the satellite or the different satellite. For example, the gateway can perform L1 and L2 Rx/Tx up procedures to enable Rx/Tx interfaces for the different communication link in order to establish the different communication link and enable communications through the different communication link.

In some cases, performing the handover can also include disabling or changing, at the gateway, beam pointing (e.g., via a BPS Tx/Rx down command 326) associated with the communication link between the gateway and the satellite, and enabling beam pointing (e.g., via a BPS up command 336) associated with the different communication link between the gateway and one of the satellite or the different satellite. In some aspects, performing the handover can include transferring a communication link and/or connectivity from a beam of the gateway to a different beam of the gateway.

At block 1030, the method 1020 can include transmitting, by the gateway after the handover, one or more packets via the different communication link between the gateway and one of the satellite or the different satellite. In some cases, the method 1000 can also include receiving, by the gateway after the handover, one or more packets via the different communication link.

In some examples, the methods 1000 and 1020 may be performed by one or more computing devices or apparatuses. In one illustrative example, the methods 1000 and 1020 can be performed by a user terminal, SAG, or SAT shown in FIG. 1A and/or one or more computing devices with the computing device architecture 1100 shown in FIG. 11. In some cases, such a computing device or apparatus may include a processor, microprocessor, microcomputer, or other component of a device that is configured to carry out the steps of the method 1000 and/or 1020. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods 1000 and 1020 are illustrated as logical flow diagrams, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods 1000 and 1020 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 11 illustrates an example computing device architecture 1100 of an example computing device which can implement various techniques described herein. For example, the computing device architecture 1100 can be used to implement at least some portions of the SATs 102, the SAGs 104, the PoP sites 140, the user terminals 112 and/or the user network devices 114 shown in FIGS. 1A, 1B, and 1C, and perform at least some of the low latency handover operations described herein. The components of the computing device architecture 1100 are shown in electrical communication with each other using a connection 1105, such as a bus. The example computing device architecture 1100 includes a processing unit (CPU or processor) 1110 and a computing device connection 1105 that couples various computing device components including the computing device memory 1115, such as read only memory (ROM) 1120 and random access memory (RAM) 1125, to the processor 1110.

The computing device architecture 1100 can include a cache of high-speed memory connected directly with, in close proximity to, or integrated as part of the processor 1110. The computing device architecture 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other computing device memory 1115 may be available for use as well. The memory 1115 can include multiple different types of memory with different performance characteristics. The processor 1110 can include any general purpose processor and a hardware or software service stored in storage device 1130 and configured to control the processor 1110 as well as a special-purpose processor where software instructions are incorporated into the processor design. The processor 1110 may be a self-contained system, containing multiple cores or processors, a bus, memory controller, cache, etc. A multi-core processor may be symmetric or asymmetric.

To enable user interaction with the computing device architecture 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art, such as a display, projector, television, speaker device. In some instances, multimodal computing devices can enable a user to provide multiple types of input to communicate with the computing device architecture 1100. The communication interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. The storage device 1130 can include software, code, firmware, etc., for controlling the processor 1110. Other hardware or software modules are contemplated. The storage device 1130 can be connected to the computing device connection 1105. In one aspect, a hardware module that performs a particular function can include the software component stored in a computer-readable medium in connection with the necessary hardware components, such as the processor 1110, connection 1105, output device 1135, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication devices, or integrated circuit devices having multiple uses including application in wireless communications and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
    receiving, by a satellite, a schedule of communications between the satellite and one or more gateways, wherein the schedule of communications is based at least in part on ephemeris data associated with the satellite;
    requesting, by the satellite, based on the schedule, a handover from a communication link between the satellite and a gateway to a different communication link between the satellite and one of the gateway or a different gateway;
    performing the handover from the communication link between the satellite and the gateway to the different communication link between the satellite and the one of the gateway or the different gateway; and
    after the handover, transmitting, by the satellite, one or more packets via the different communication link between the satellite and one of the gateway or the different gateway.

2. The method of claim 1, further comprising processing packets bicasted over the communication link between the satellite and the gateway and the different communication link between the satellite and one of the gateway or the different gateway, wherein processing the packets bicasted over the communication link between the satellite and the gateway and the different communication link between the satellite and one of the gateway or the different gateway comprises transmitting a respective copy of a set of duplicate packets over each of the communication link between the satellite and the gateway and the different communication link between the satellite and one of the gateway or the different gateway.

3. The method of claim 1, further comprising processing packets bicasted over the communication link between the satellite and the gateway and the different communication link between the satellite and one of the gateway or the different gateway, wherein processing the packets bicasted over the communication link between the satellite and the gateway and the different communication link between the satellite and one of the gateway or the different gateway comprises receiving duplicate packets through the communication link between the satellite and the gateway and the different communication link between the satellite and one of the gateway or the different gateway.

4. The method of claim 1, wherein performing the handover comprises terminating the communication link between the satellite and the gateway by:
    disabling, at a layer 2 (L2) and layer 1 (L1) of the satellite, one or more receive (Rx) and transmit (Tx) interfaces associated with the communication link between the satellite and the gateway.

5. The method of claim 4, wherein performing the handover comprises:
    configuring, at the L1 and L2 of the satellite, Rx and Tx communications associated with the different communication link between the satellite and one of the gateway or the different gateway; and
    establishing the different communication link between the satellite and one of the gateway or the different gateway.

6. The method of claim 5, wherein performing the handover comprises:
    disabling, at the satellite, beam pointing associated with the communication link between the satellite and the gateway; and
    enabling beam pointing associated with the different communication link between the satellite and one of the gateway or the different gateway.

7. The method of claim 1, wherein the communication link between the satellite and the gateway comprises the gateway and a first point of presence (PoP) site, and wherein the different communication link between the satellite and one of the gateway or the different gateway comprises the different gateway and at least one of the first PoP site and a second PoP site.

8. The method of claim 1, further comprising:
performing an additional handover of connectivity between the satellite and a user terminal, the additional handover comprising a transfer of the connectivity from a beam of the satellite to a different beam of the satellite, wherein at least part of the additional handover and the handover from the communication link to the different communication link are performed during a same time period.

9. The method of claim 1, further comprising:
performing an additional handover from a previous communication link between a user terminal and a previous satellite to a new communication link between the user terminal and the satellite, wherein at least part of the additional handover and the handover from the communication link to the different communication link are performed during a same time period.

10. At least one non-transitory computer-readable storage medium comprising instructions stored thereon which, when executed by one or more processors, cause the one or more processors to:
receive, by a satellite, a schedule of communications between the satellite and one or more gateways, wherein the schedule of communications is based at least in part on ephemeris data associated with the satellite;
request, based on the schedule, a handover from a communication link between the satellite and a gateway to a different communication link between the satellite and one of the gateway or a different gateway;
perform the handover from the communication link between the satellite and the gateway to the different communication link between the satellite and the one of the gateway or the different gateway; and
after the handover, transmit, by the satellite, one or more packets via the different communication link between the satellite and one of the gateway or the different gateway.

11. The at least one non-transitory computer-readable storage medium of claim 10, further comprising processing packets bicasted over the communication link between the satellite and the gateway and the different communication link between the satellite and one of the gateway or the different gateway, wherein processing the packets bicasted over the communication link between the satellite and the gateway and the different communication link between the satellite and one of the gateway or the different gateway comprises: transmitting a respective copy of a set of duplicate packets over each of the communication link between the satellite and the gateway and the different communication link between the satellite and one of the gateway or the different gateway.

12. The at least one non-transitory computer-readable storage medium of claim 10, further comprising processing packets bicasted over the communication link between the satellite and the gateway and the different communication link between the satellite and one of the gateway or the different gateway, wherein processing the packets bicasted over the communication link between the satellite and the gateway and the different communication link between the satellite and one of the gateway or the different gateway comprises: receiving duplicate packets through the communication link between the satellite and the gateway and the different communication link between the satellite and one of the gateway or the different gateway.

13. The at least one non-transitory computer-readable storage medium of claim 10, storing instructions which, when executed by the one or more processors, cause the one or more processors to:
disable, at a layer 2 (L2) and layer 1 (L1) of the satellite, one or more receive (Rx) and transmit (Tx) interfaces associated with the communication link between the satellite and the gateway;
configure, at the L1 and L2 of the satellite, Rx and Tx communications associated with the different communication link between the satellite and one of the gateway or the different gateway; and
establish the different communication link between the satellite and one of the gateway or the different gateway.

14. The at least one non-transitory computer-readable storage medium of claim 10, storing instructions which, when executed by the one or more processors, cause the one or more processors to:
perform an additional handover of connectivity between the satellite and a user terminal, the additional handover comprising a transfer of the connectivity from a beam of the satellite to a different beam of the satellite, wherein at least part of the additional handover and the handover from the communication link to the different communication link are performed during a same time period.

15. The at least one non-transitory computer-readable storage medium of claim 13, storing instructions which, when executed by the one or more processors, cause the one or more processors to:
perform an additional handover from a previous communication link between a user terminal and a previous satellite to a new communication link between the user terminal and the satellite, wherein at least part of the additional handover and the handover from the communication link to the different communication link are performed during a same time period.

16. A gateway system comprising:
one or more processors; and
at least one non-transitory computer-readable medium having stored thereon instructions that, when executed by the one or more processors, cause the one or more processors to:
receive a schedule of communications between the gateway system and a satellite, wherein the schedule of communications is based at least in part on ephemeris data associated with the satellite;
transmit, by a communication link between the gateway system and the satellite, one or more packets;
enable, by the gateway system, based on the schedule, a different communication link between the gateway system and the satellite; and
transmit, after a handover, by the satellite from the communication link to the different communication link, one or more packets via the different communication link between the gateway system and the satellite.

17. The gateway system of claim 16, the at least one non-transitory computer-readable medium having stored thereon instructions that, when executed by the one or more processors, cause the one or more processors to: process packets bicasted over the communication link between the gateway system and the satellite and the different communication link between the gateway system and the satellite, wherein processing the packets bicasted over the communication link between the gateway system and the satellite and the different communication link between the gateway system and the satellite comprises: transmitting a respective copy of a set of duplicate packets over each of the communication link between the gateway system and the satellite and the different communication link between the gateway system and the satellite.

18. The gateway system of claim 16, the at least one non-transitory computer-readable medium having stored thereon instructions that, when executed by the one or more processors, cause the one or more processors to: process packets bicasted over the communication link between the gateway system and the satellite and the different communication link between the gateway system and the satellite, wherein processing the packets bicasted over the communication link between the gateway system and the satellite and the different communication link between the gateway system and one of the satellite or a different satellite comprises: receiving duplicate packets through the communication link between the gateway system and the satellite and the different communication link between the gateway system and one of the satellite or a different satellite.

19. The gateway system of claim 16, the at least one non-transitory computer-readable medium having stored thereon instructions that, when executed by the one or more processors, cause the one or more processors to:
disable, at a layer 2 (L2) and layer 1 (L1) of the gateway system, one or more receive (Rx) and transmit (Tx) interfaces associated with the communication link between the gateway system and the satellite;
configure, at the L1 and L2 of the gateway system, Rx and Tx communications associated with the different communication link between the gateway system and the satellite; and
establish the different communication link between the gateway system and the satellite.

20. The gateway system of claim 16, the at least one non-transitory computer-readable medium having stored thereon instructions that, when executed by the one or more processors, cause the one or more processors to:
disable beam pointing associated with the communication link between the gateway system and the satellite; and
enable beam pointing associated with the different communication link between the gateway system and one of the satellite or the different satellite.

21. A method comprising:
receiving, by a satellite, a schedule of communications between the satellite and one or more gateways;
requesting, based on the schedule, a handover from a communication link between the satellite and a gateway to a different communication link between the satellite and one of the gateway or a different gateway;
processing, prior to a completion of the handover, packets bicasted over the communication link between the satellite and the gateway and the different communication link between the satellite and one of the gateway or the different gateway;
performing the handover from the communication link between the satellite and the gateway to the different communication link between the satellite and the one of the gateway or the different gateway; and
after the handover, transmitting, by the satellite, one or more packets via the different communication link between the satellite and one of the gateway or the different gateway.

22. A gateway system comprising:
one or more processors; and
at least one non-transitory computer-readable medium having stored thereon instructions that, when executed by the one or more processors, cause the one or more processors to:
receive a schedule of communications between the gateway system and one or more gateways;
request, based on the schedule, a handover from a communication link between the gateway system and a satellite to a different communication link between the gateway system and one of the satellite or a different satellite;
process, prior to a completion of the handover, packets bicasted over the communication link between the gateway system and the satellite and the different communication link between the gateway system and one of the satellite or a different satellite;
perform the handover from the communication link between the gateway system and the satellite and the different communication link between the gateway system and one of the satellite or a different satellite; and
after the handover, transmit one or more packets via the different communication link between the gateway system and one of the satellite or a different satellite.

* * * * *